(12) United States Patent
Barnard et al.

(10) Patent No.: US 6,920,506 B2
(45) Date of Patent: Jul. 19, 2005

(54) DISCOVERY AND MANAGEMENT OF NETWORK PRINTERS

(75) Inventors: John D. Barnard, Orange, CA (US); Don Hideyasu Matsubayashi, Monterey, CA (US); Don Francis Purpura, Yorba Linda, CA (US); Ravichandran Ragunathan, Ladera Ranch, CA (US); Steve Yasuhiro Muto, Irvine, CA (US); Allison Bajo, Carson, CA (US); Richard A. Wilson, Jr., Fallbrook, CA (US)

(73) Assignee: Canon Information Systems, Inc., Irvine, CA (US)

( * ) Notice: Subject to any disclaimer, the term of this patent is extended or adjusted under 35 U.S.C. 154(b) by 660 days.

(21) Appl. No.: 09/895,021

(22) Filed: Jun. 28, 2001

(65) Prior Publication Data

US 2003/0005100 A1 Jan. 2, 2003

(51) Int. Cl.[7] .............................................. G06F 15/16
(52) U.S. Cl. ..................................... 709/245; 709/223
(58) Field of Search ................................. 709/245, 223

(56) References Cited

U.S. PATENT DOCUMENTS

| | | | |
|---|---|---|---|
| 5,564,109 A | 10/1996 | Snyder et al. ............... | 395/828 |
| 5,655,148 A | 8/1997 | Richman et al. ............ | 395/828 |
| 5,764,911 A | 6/1998 | Tezuka et al. ............... | 395/200 |
| 5,918,016 A | 6/1999 | Brewer et al. ............... | 395/200 |
| 5,922,049 A | 7/1999 | Radia et al. ................. | 709/220 |
| 6,029,155 A | 2/2000 | Bass et al. ................... | 705/401 |
| 6,073,178 A | 6/2000 | Wong et al. ................. | 709/229 |
| 6,101,499 A | 8/2000 | Ford et al. ..................... | 707/10 |
| 6,112,256 A | 8/2000 | Goffinet et al. ................ | 710/8 |
| 6,145,031 A | 11/2000 | Mastie et al. ................. | 710/52 |
| 6,178,455 B1 * | 1/2001 | Schutte et al. .............. | 709/228 |
| 6,184,996 B1 | 2/2001 | Gase ........................ | 358/1.15 |
| 6,195,709 B1 | 2/2001 | Güpner et al. .............. | 709/316 |
| 6,324,577 B1 * | 11/2001 | Hirai .......................... | 709/223 |
| 6,792,474 B1 * | 9/2004 | Hopprich et al. ........... | 709/245 |

FOREIGN PATENT DOCUMENTS

| | | |
|---|---|---|
| EP | 0 952 513 | 10/1999 |
| WO | WO 00/26807 | 5/2000 |

* cited by examiner

Primary Examiner—Mehmet B. Geckil
(74) Attorney, Agent, or Firm—Fitzpatrick, Cella, Harper & Scinto

(57) ABSTRACT

Managing a plurality of network devices on a network, including detecting an address assignment message sent from an address server over the network to a network device, the address assignment message containing an assigned address corresponding to the network device, sending an information request message, in response to the detection of the address assignment message, over the network from the network management device to the network device, the information request message containing the assigned address corresponding to the network device, receiving information, in response to the information request message, from the network device, and creating an entry corresponding to the network device in a device management directory, the entry containing the assigned address corresponding to the network device and the information received from the network device.

184 Claims, 31 Drawing Sheets

DEVICE MANAGEMENT DIRECTORY 70

| ENTRY 90 | MAC ADDRESS 91 | PRINT DEVICE TYPE 92 | IP ADDRESS 93 | NETWORK CONFIGURATION INFORMATION 94 |
|---|---|---|---|---|
| Entry 1 | 00:00:85:69:0A:B3 | Canon Laser | 129.65.220.8 | Domain Name, etc. |
| --- | --- | --- | --- | --- |
| --- | --- | --- | --- | --- |
| --- | --- | --- | --- | --- |
| --- | --- | --- | --- | --- |
| --- | --- | --- | --- | --- |
| Entry N | --- | --- | --- | --- |

FIG. 7

PRINT QUEUE CONFIGURATION DIRECTORY 71

| | IP ADDRESS 100 | MAC ADDRESS 101 | PRINT QUEUE NAME 102 | PRINTING CAPABILITIES 103 | SERVER 105 |
|---|---|---|---|---|---|
| Entry 1 | 129.65.220.8 | 00:00:85:69:0A:B3 | Canon Laser | Color, Letter, A4 | Main A |
| -- | -- | -- | -- | -- | -- |
| -- | -- | -- | -- | -- | -- |
| -- | -- | -- | -- | -- | -- |
| -- | -- | -- | -- | -- | -- |
| -- | -- | -- | -- | -- | -- |
| ENTRY N | -- | -- | -- | -- | -- |

FIG. 8

SERVICES DIRECTORIES 72

LOCAL SERVICES DIRECTORY (120)

| SUBNET ID (122) | SERVICE (124) | NMD ID (125) |
|---|---|---|
| 1 | DISCOVERY | NMD 1 |
| 1 | PRINT QUEUE | NMD 2 |

GLOBAL SERVICES DIRECTORY (121)

| SUBNET ID (122) | SERVICE (124) | NMD ID (125) |
|---|---|---|
| 1 | PRINT QUEUE | NMD 1 |
| 1 | DISCOV. SERV. MGR. | NMD 3 |
| 1 | GLOBAL INFO SERV. | NMD 1 |

FIG. 11

| GLOBAL SERVICES DIRECTORY 121 | | |
|---|---|---|
| SUBNET ID 122 | SERVICE 124 | NMD ID 125 |
| 1 | MASTER | NMD 1 |
| 1 | DISC. SERV. MGR. | NMD 3 |
| 1 | GLOBAL INFO SERV. | NMD 1 |
| 1 | PRINT QU. SERV. MGR. | NMD 3 |
| • | | |
| • | | |
| • | | |
| • | | |

*FIG. 12*

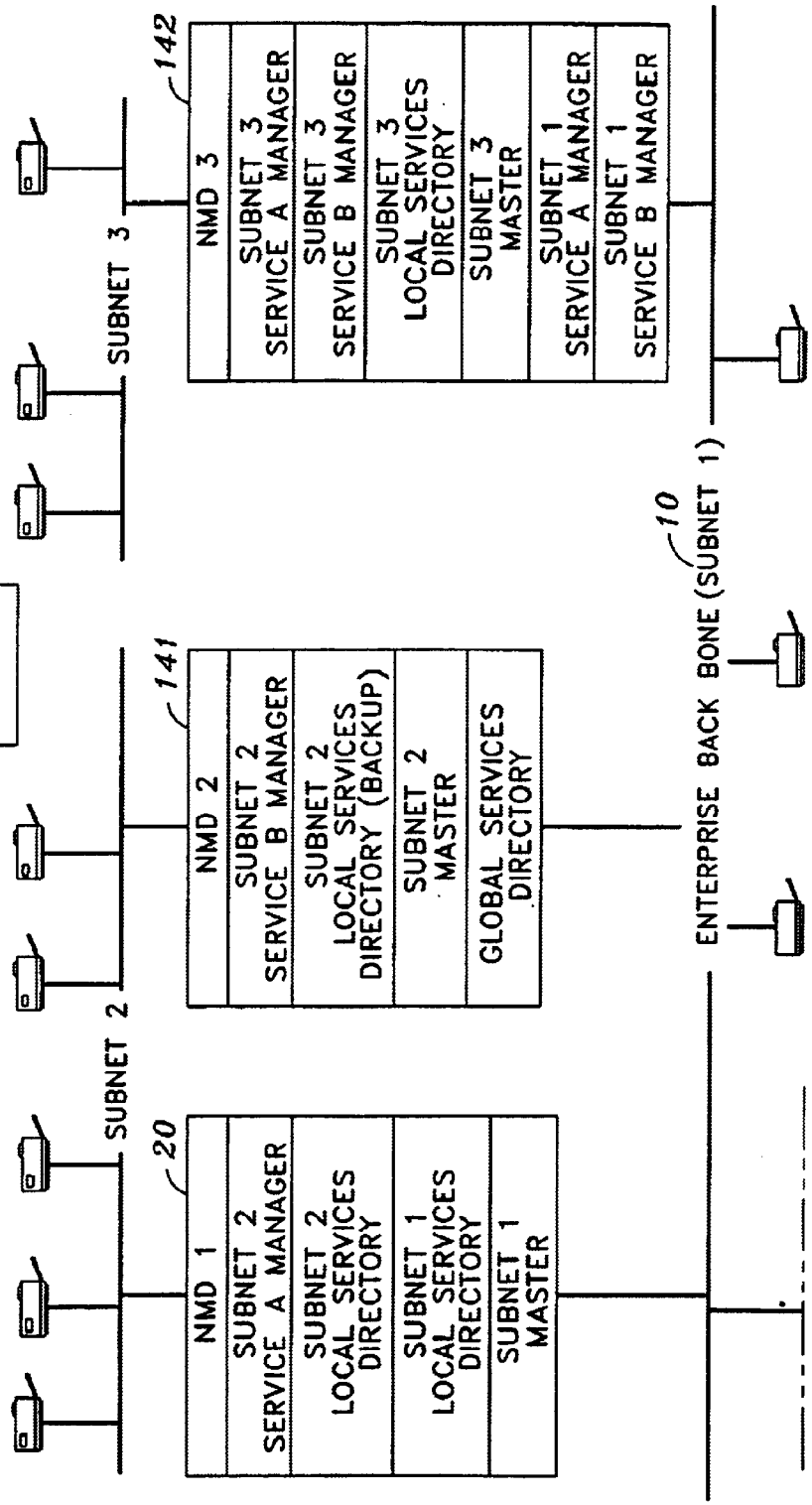

FIG. 18A

| FIG. 18A |
|---|
| FIG. 18B |

| SUBNET | NMD 1 COMPONENT | STATE |
|---|---|---|
| 1 | PRINTER QUEUE SERVICE | NOT RUNNING |
| 1 | DISCOVERY SERVICE | NOT RUNNING |
| 1 | LOCAL SERVICES DIRECTORY | RUNNING |
| 1 | MASTER | RUNNING |
| 2 | PRINTER QUEUE SERVICE | RUNNING |
| 2 | DISCOVERY SERVICE | NOT RUNNING |
| 2 | LOCAL SERVICES DIRECTORY | RUNNING |
| 2 | MASTER | NOT RUNNING |
| 2 | GLOBAL SERVICES DIRECTORY | NOT RUNNING/BACKUP |

{ 141

| SUBNET | NMD 2 COMPONENT | STATE |
|---|---|---|
| 1 | PRINTER QUEUE SERVICE | NOT RUNNING |
| 1 | DISCOVERY SERVICE | NOT RUNNING |
| 1 | LOCAL SERVICES DIRECTORY | NOT RUNNING/BACKUP |
| 1 | MASTER | NOT RUNNING |
| 2 | PRINTER QUEUE SERVICE | NOT RUNNING |
| 2 | DISCOVERY SERVICE | RUNNING |
| 2 | LOCAL SERVICES DIRECTORY | BACKUP |
| 2 | MASTER | RUNNING |
| 2 | GLOBAL SERVICES DIRECTORY | RUNNING |

FIG. 18B

| SUBNET | NMD 3 COMPONENT | STATE |
|---|---|---|
| 1 | PRINTER QUEUE SERVICE | RUNNING |
| 1 | DISCOVERY SERVICE | RUNNING |
| 1 | LOCAL SERVICES DIRECTORY | NOT RUNNING/BACKUP |
| 1 | MASTER | NOT RUNNING |
| 3 | PRINTER QUEUE SERVICE | RUNNING |
| 3 | DISCOVERY SERVICE | RUNNING |
| 3 | LOCAL SERVICES DIRECTORY | RUNNING |
| 3 | MASTER | RUNNING |
| 3 | GLOBAL SERVICES DIRECTORY | NOT RUNNING/BACKUP |

142

| SUBNET | NMD 4 COMPONENT | STATE |
|---|---|---|
| 4 | PRINTER QUEUE SERVICE | RUNNING |
| 4 | DISCOVERY SERVICE | RUNNING |
| 4 | LOCAL SERVICES DIRECTORY | RUNNING |
| 4 | MASTER | RUNNING |
| 4 | GLOBAL SERVICES DIRECTORY | BACKUP |

145

| SUBNET | NMD 5 COMPONENT | STATE |
|---|---|---|
| 4 | PRINTER QUEUE SERVICE | NOT RUNNING |
| 4 | DISCOVERY SERVICE | NOT RUNNING |
| 4 | LOCAL SERVICES DIRECTORY | NOT RUNNING/BACKUP |
| 4 | MASTER | NOT RUNNING |
| 5 | PRINTER QUEUE SERVICE | RUNNING |
| 5 | DISCOVERY SERVICE | RUNNING |
| 5 | LOCAL SERVICES DIRECTORY | RUNNING |
| 5 | MASTER | RUNNING |
| 5 | GLOBAL SERVICES DIRECTORY | NOT RUNNING/BACKUP |

144

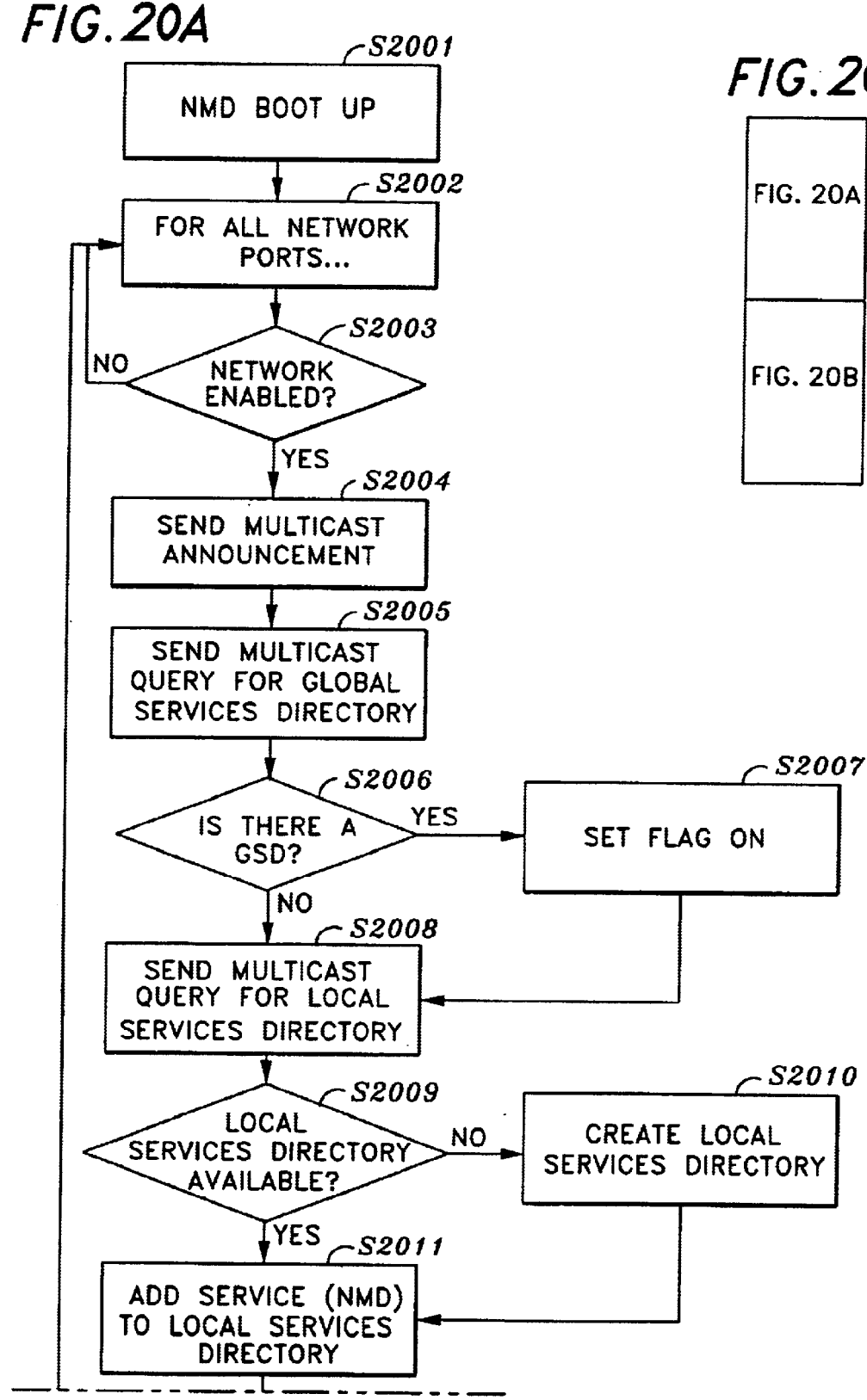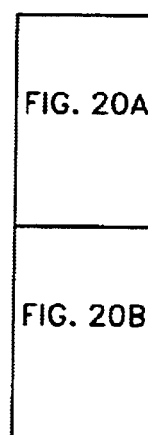

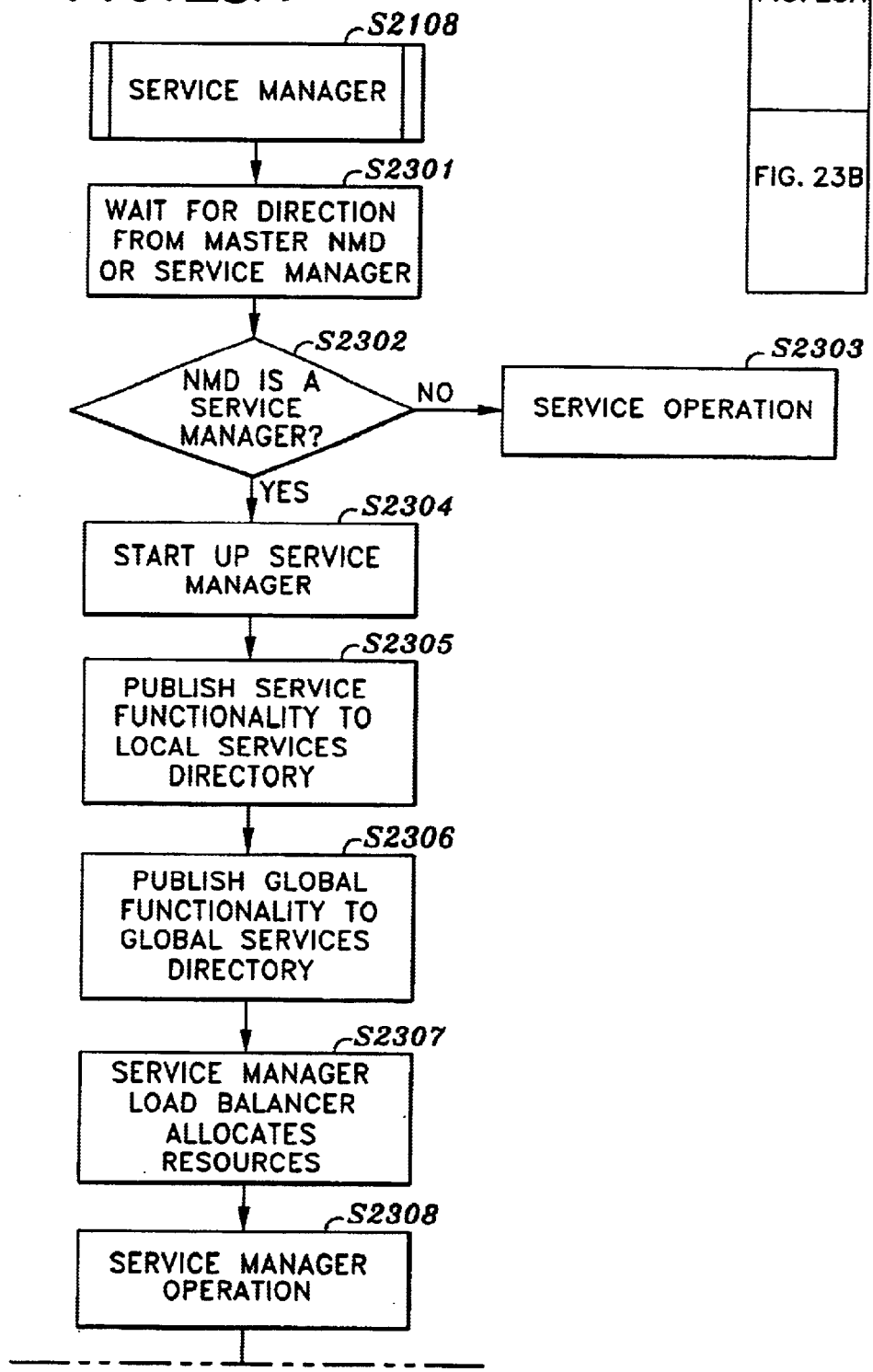

DISCOVERY AND MANAGEMENT OF NETWORK PRINTERS

BACKGROUND OF THE INVENTION

1. Field of the Invention

The invention concerns a network appliance for automatic detection and management of network devices connected to the network appliance. Specifically, the invention detects a network device by listening for an IP address request from the network device, and then obtaining configuration information and capabilities of the network device by using the IP address provided to the network device. The network appliance provides a common focal point for the network administrator to configure and manage all network devices detected by the network appliance.

2. Incorporation by Reference

U.S. patent application Ser. No. 09/664,531, entitled "Object-Based Architecture For Supporting Network Devices," filed Sep. 18, 2000, is incorporated by reference as if fully set forth in full herein.

3. Description of the Related Art

The administration of network devices, such as network printers, in a network environment is typically a tedious and time consuming task for network managers. In particular, for large and complex network environments having several local servers, there may be a large number of printers distributed throughout the network. Many of the printers may be physically remote from the location of the network administrator. In traditional network environments, the network administrator has to travel to the location of each new printer to install the printer on the network and to configure the network settings, which can include the printer name and a unique IP address for the printer.

The network administrator also may need to setup a corresponding print queue on a print server for the printer. The print server may be maintained in a local server or on another server which is remote from the printer. It can be appreciated that a large, complex network can have a great number of print servers to accommodate all printers on the network. A print queue is setup by the network administrator by entering information about the printer, such as network configuration information, as well as information regarding the printer name, printer functionality and capabilities, and the printer driver associated with the printer. In addition, the network administrator may setup the print queue based on additional information regarding which network users are allowed access to the printer, and what type of print jobs can be submitted to the printer. The network administrator then has to publish the new print queue for access by the appropriate network users. Accordingly, installation of a new printer may require the network administrator to work at the location of the new printer and at the location of the print server on which the new corresponding print queue is hosted. In such an environment, the print queues for all printers on the network are distributed in a diverse manner across several different servers.

In addition to installing new printers on the network, the network administrator must go through a similar process each time a network printer is reconfigured. For example, a printer may be moved to another location and given another name for use by a different set of network users, or new capabilities may be added to the printer, or the network settings of the printer may be modified. In each case, the network administrator must make sure that the network server and the corresponding print queue are modified to reflect the changes. In addition, some of the foregoing changes may require notification to the appropriate user workstations to modify the corresponding printer settings on the workstation.

In a large enterprise, such as a large, physically distributed company with large numbers of printers, the foregoing system administrative tasks related to network printers can be overwhelming. In addition to the network administration tasks associated with the printers, other network problems can arise in relation to the printers. For example, a large number of printers on the network can generate a significant amount of network traffic between the print servers and the printers. Network traffic can also be generated during network administration of the printers if a network management tool is utilized which continuously polls for the presence of the printers and which obtains configuration and capability information from the printers. Such large amounts of network traffic can detract from the other communication between workstations, servers, and other network devices. Furthermore, a large number of printers in a network environment can consume a large number of corresponding IP addresses which may limit the total number of IP addresses available on the network for other devices.

Other considerations in conventional network environments include user policy and security problems. For example, a network user is able to see the presence of a printer at the user's workstation, but may not have authorization to access the print queue associated with the printer. Such a user may then use the IP address of the printer to send a rendered print job directly to the printer without going through the print queue. Such an action would be in violation of user policy and could be a security breach if a sensitive document is printed to a printer at an unsecured location.

Network management tools, such as administration software and stand-alone appliances, have been developed in an attempt to make the network administration of printers more efficient for a network administrator. However, such network management tools often require that the network printers have special software to simulate a plug-and-play functionality for detection and configuration of the printers. For example, the network printers may require special software to initiate a discovery process and publish information about itself to the network. In addition, many such network management tools require frequent issuance of broadcast messages or status messages to all printers on the network to detect new printers and/or monitor for changes in existing printers. As mentioned above, this additional network traffic is undesirable and can cause network congestion. In the case that a plurality of network management tools are utilized in a large network environment to handle all printers in a distributed fashion, the network administrator does not have a single focal point from which to efficiently manage all printers. Lastly, known network management tools are not believed to be extendable to provide additional printer support functionality as needed in accordance with a particular network environment.

SUMMARY OF THE INVENTION

The present invention addresses the foregoing problems by providing a management tool for managing a plurality of network devices, such as network printers, copiers and other devices, on a network in an efficient fashion. In particular, the initial network configuration of a network device is automatically managed by the present invention because the presence of each new network device on the network is automatically detected. Upon the detection of a new network device, discovery is conducted to obtain configuration information and capabilities information regarding the detected network device. Upon completion of such discovery, the present invention enables the functional support for the network device, such as creation and management of a print queue corresponding to a printing device, and other functional support for the network device. In addition, the network management device of the present invention allows for a plurality of network devices to be connected to the network management device over a local network, while only the network management device is connected to the main network, thereby isolating the network devices from all other devices on the main network and requiring the other devices on the main network to go through the network management device to access the functional services and capabilities of the plurality of network devices. Lastly, the network management device of the present invention provides support for a user interface for network administration of all network devices being managed by the network management device, and by all other network management devices on the main network.

Accordingly, one aspect of the invention concerns managing a plurality of network devices on a network, including detecting an address assignment message sent from an address server over the network to a network device, the address assignment message containing an assigned address corresponding to the network device, sending an information request message, in response to the detection of the address assignment message, over the network from the network management device to the network device, the information request message containing the assigned address corresponding to the network device, receiving information, in response to the information request message, from the network device, and creating an entry corresponding to the network device in a device management directory, the entry containing the assigned address corresponding to the network device and the information received from the network device.

Preferably, the network device is a network printer, although other network devices are supported by the invention. In addition, the network management device utilizes the initial DHCP address request from the network device to initiate discovery of the network device. Furthermore, a predetermined set of MAC address ranges can be set to limit the network devices that are processed for discovery by the present invention. In this manner, a network administrator can limit the present invention to discover only network devices of a certain type. The present invention also preferably allows for a plurality of such network management devices for distribution across a large, complex network in order to detect and manage all network devices throughout the network. In such an embodiment, the plurality of network devices managed by each network management device are preferably connected to each respective network management device by a local network and are not visible to all other servers, workstations and other devices on the main network. In addition, in a multiple network management device environment, the detection and management of all network devices on the network is performed in a coordinated fashion between the multiple network management devices to avoid unnecessary redundancy and network confusion, and to balance the functional support for all network devices among the multiple network management devices based on resource availability and location of each network management device.

According to another aspect, the invention is directed to managing a plurality of network printers on a network with a network management device in which an address request message is received from one of the plurality of network printers, the address request message containing a MAC address corresponding to the network printer. An address assignment message is sent from an address server in the network management device over the network to the network printer, the address assignment message containing the MAC address and an assigned IP address corresponding to the network printer, and a discovery module in the network management device is notified of the assigned IP address of the network printer. It is determined, in the discovery module, if the MAC address of the network printer is within a predetermined range of MAC addresses. In the case that the MAC address of the network printer is within the predetermined range of MAC addresses, an information request message is sent from the discovery module over the network to the network printer, the information request message containing the assigned IP address corresponding to the network printer. Information from the network printer is received in response to the information request message, in the case that the MAC address of the network printer is within the predetermined range of MAC addresses. An entry is created corresponding to the network printer in a device management directory, in the case that the MAC address of the network printer is within a predetermined range of MAC addresses, wherein the entry contains the MAC address and the assigned IP address corresponding to the network printer, and contains the information received from the network printer.

Preferably, the address request message is a DHCP address request. The present invention also preferably allows for a plurality of such network management devices for distribution across a large, complex network in order to detect and manage all network printers throughout the network. In such an embodiment, the set of network printers managed by each network management device are preferably connected to the respective network management device by a local network and are not visible to all other servers, workstations and other devices on the main network. In addition, in a multiple network management device environment, the detection and management of all network printers on the network is performed in a coordinated fashion between the multiple network management devices to avoid unnecessary redundancy and network confusion, and to balance the functional support for all network printers among the multiple network management devices based on resource availability and location of each network management device.

By virtue of the foregoing, efficient management of a large number of network devices, such as network printers and other devices, across a network can be provided so that the initialization and network configuration of network devices across a network is automatically managed, thereby greatly reducing the effort required by a network administrator. In addition, the plurality of network devices can be physically isolated from a main network by use of the present invention such that undesirable network traffic associated with the network devices is removed from the main network and such that network users cannot access or use the network devices without going through an associated network management device, thereby preventing security and network policy problems. Furthermore, multiple network management devices can be used to manage all network devices across a network to provide a single focal point user interface for a network administrator to manage all of the network devices. Lastly, the isolation of the network devices from the main network through the use of the present invention can allow the network devices to use local IP addresses on local networks corresponding to each of the network management devices, thereby saving valuable IP addresses for use by other devices on the main network.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 7 is a block diagram depicting a device management directory for use in one embodiment of the present invention.

FIG. 8 is a block diagram depicting a print queue configuration directory for use in one embodiment of the present invention.

FIG. 11 is a block diagram depicting service directories for use in one embodiment of the present invention.

FIG. 12 is a block diagram depicting a global service directory for use in one embodiment of the present invention.

FIG. 18 is a table diagram for explaining the use of multiple network management devices in a network environment according to one embodiment of the present invention.

DETAILED DESCRIPTION OF THE PREFERRED EMBODIMENTS

Figure 1:
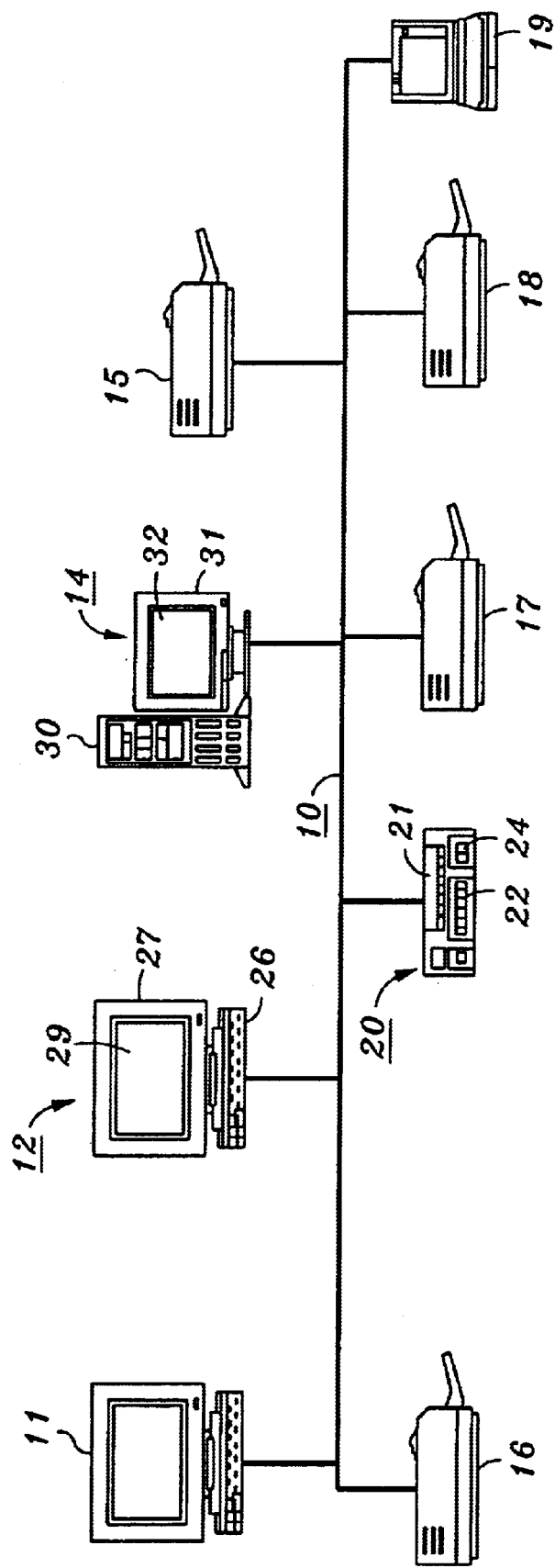
FIG. 1 is a depiction of a network environment in which the present invention may be practiced.

FIG. 1 depicts a network environment in which the present invention may be practiced. As seen in FIG. 1, network 10 is provided which is a typical network that is supported by TCP/IP and other protocols as discussed further herein. Connected to network 10 are workstations 11 and 12, server 14, printers 15, 16, 17 and 18, laptop 19 and network management device 20. Network management device 20 is used to implement the present invention for managing a plurality of network devices, such as network printers 15, 16, 17 and 18. The configuration and functionality of network management device 20 is discussed in more detail below. In this regard, the invention is described below with respect to management of network printers; however, it should be appreciated that the present invention of network management device 20 can be used to manage any type of network device.

Workstations 11 and 12 are typical computing workstations having host processor 26 for supporting user interface 29, thereby allowing a user of either one of workstations 11 or 12 to work with typical applications, such as word processing, and to access functional services provided by other devices on network 10, such as printing services.

Server 14 is a typical server having host processor 30 which includes a large fixed disk for containing files and/or applications which can be accessed and shared by other users on network 10. Server 14 also has display 31 for supporting user interface 32. Laptop 19 is a conventional laptop computer having a host processor and display, thereby allowing it to operate in a manner similar to workstations 11 and 12.

Figure 2:
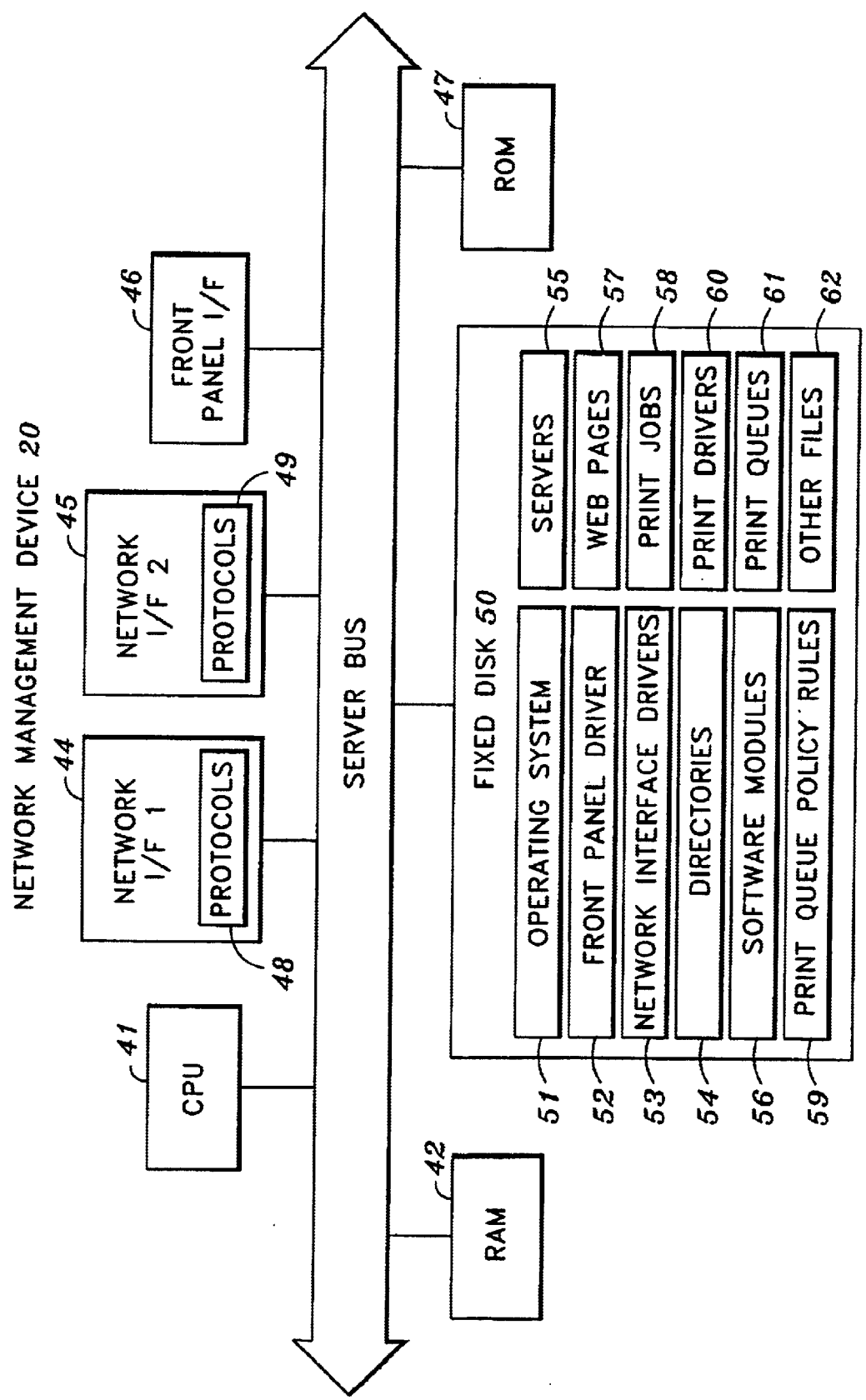
FIG. 2 is a block diagram illustrating an internal architecture a network management device according to one embodiment of the present invention.

FIG. 2 is a block diagram for explaining the internal architecture of network management device 20. As seen in FIG. 2, network management device 20 has a configuration similar to that of a server and includes server bus 40, CPU 41, RAM 42, ROM 47, network interfaces 44 and 45, front panel interface 46 and fixed disk 50. CPU 41 is a programmable microprocessor which is interfaced to server bus 40. RAM 42 interfaces to server bus 40 to provide CPU 41 with access to memory storage, thereby acting as the main run time memory for CPU 41. In particular, when executing stored program instruction sequences, CPU 41 loads the instruction sequences from fixed disk 50 (or other memory media) into RAM 42 and executes those stored program instruction sequences out of RAM 42. It should also be recognized that standard disk-swapping techniques allow segments of memory to be swapped to and from RAM 42 and fixed disk 50.

ROM 47 stores invariant instruction sequences, such as startup instruction sequences for CPU 41 or basic input/output operating system ("BIOS") sequences for the operation of any peripheral devices which may be attached to server 11 (not shown). Network interfaces 44 and 45 provide two separate and distinct network interfaces, thereby allowing network management device 20 to connect to two separate networks as discussed further below. As seen in FIG. 2, network interfaces 44 and 45 each have respective protocols 48 and 49 for supporting communication of network management device 20 over network 10 with other devices on network 10. For example, protocols 48 and 49 can include, but are not limited to, TCP/IP, HTTP, SNMP, DHCP, and other known network protocols, including a variety of known printing protocols.

Front panel interface 46 provides the interface to front panel 21 provided on network management device 20, thereby allowing a user such as a system administrator to monitor and input configuration information and other commands and instructions to network management device 20.

Fixed disk 50 is one example of a computer-readable medium that stores program instruction sequences which are executable by CPU 41 so as to constitute operating system 51, front panel interface driver 52, network interface drivers 53, directories 54, servers 55, software modules 56, web pages 57, print jobs 58, print queue policy rules 59, print drivers 60, print queues 61, and other files 62. Operating system 51 can be an operating system such as DOS, or a windowing operating system for networks such as Windows NT, or can be another operating system such as Unix. Front panel interface driver 52 is provided for supporting front panel interface 46 to communicate with front panel 21. Network interface drivers 53 support network interfaces 44 and 45 for allowing network management device 20 to communicate with two separate networks, as discussed above. Directories 54 contain directories for use to implement the present invention for managing a plurality of print devices on the network and are discussed further below. Servers 55 contain necessary protocol servers and other servers for implementing the present invention and are discussed further below. Software modules 56 are utilized to implement the present invention as discussed further below. Web pages 57 comprise web pages which are accessible by users on network 10 or by a system administrator on network 10 to access functional services of printing devices on network 10 and to manage the configuration of network management device 20 and of a plurality of printing devices which are managed by network management device 20 as described further below. Print jobs 58 consist of print jobs received by network management device 20 from users on network 10, such as workstations 11 and 12, for sending to printing devices managed by network management device 20. Print queue policy rules 59 comprise a predetermined set of rules and/or rules entered by a system administrator for governing how print queues are created and published for each of the printing devices which is managed by network management device 20 as discussed further below. Print drivers 60 are print drivers for supporting the various printing devices managed by network management device 20 and print queues 61 are print queues created for the printing devices management by network management device 20. Lastly, other files 62 comprise other files and applications necessary to implement the present invention and to provide additional functionality to network management device 20.

Figure 3:
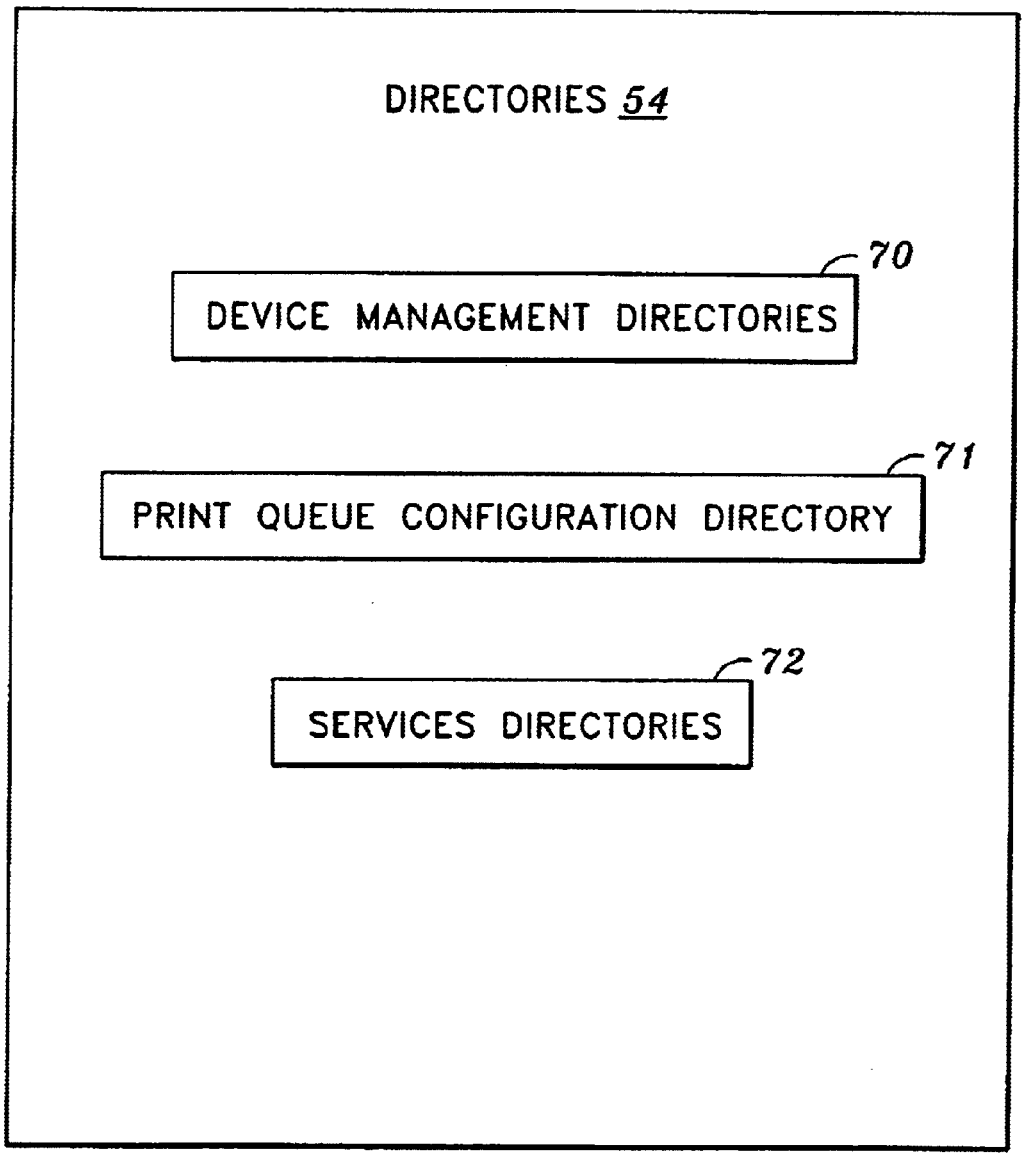
FIG. 3 is a block diagram depicting directories for use in one embodiment of the present invention.

FIG. 3 is a block diagram for showing the contents of directories 54. Specifically, directories 54 includes device management directory 70, print queue configuration directory 71 and services directories 72. Device management directories 70 include one or more device management directory which is used to store network identification and configuration information for each printing device managed by network management device 20 and is explained in further detail below. Print queue configuration directory 71 is a directory which contains printer identification information and printer capability information along with other information for each print queue which is created corresponding to a printing device managed by network management device 20. Services directories 72 include a variety of services directories for tracking and managing the functional services supported by one or more network management devices for the plurality of printing devices supported by the network management devices. Services directories 72 is discussed in more detail below.

Figure 4:
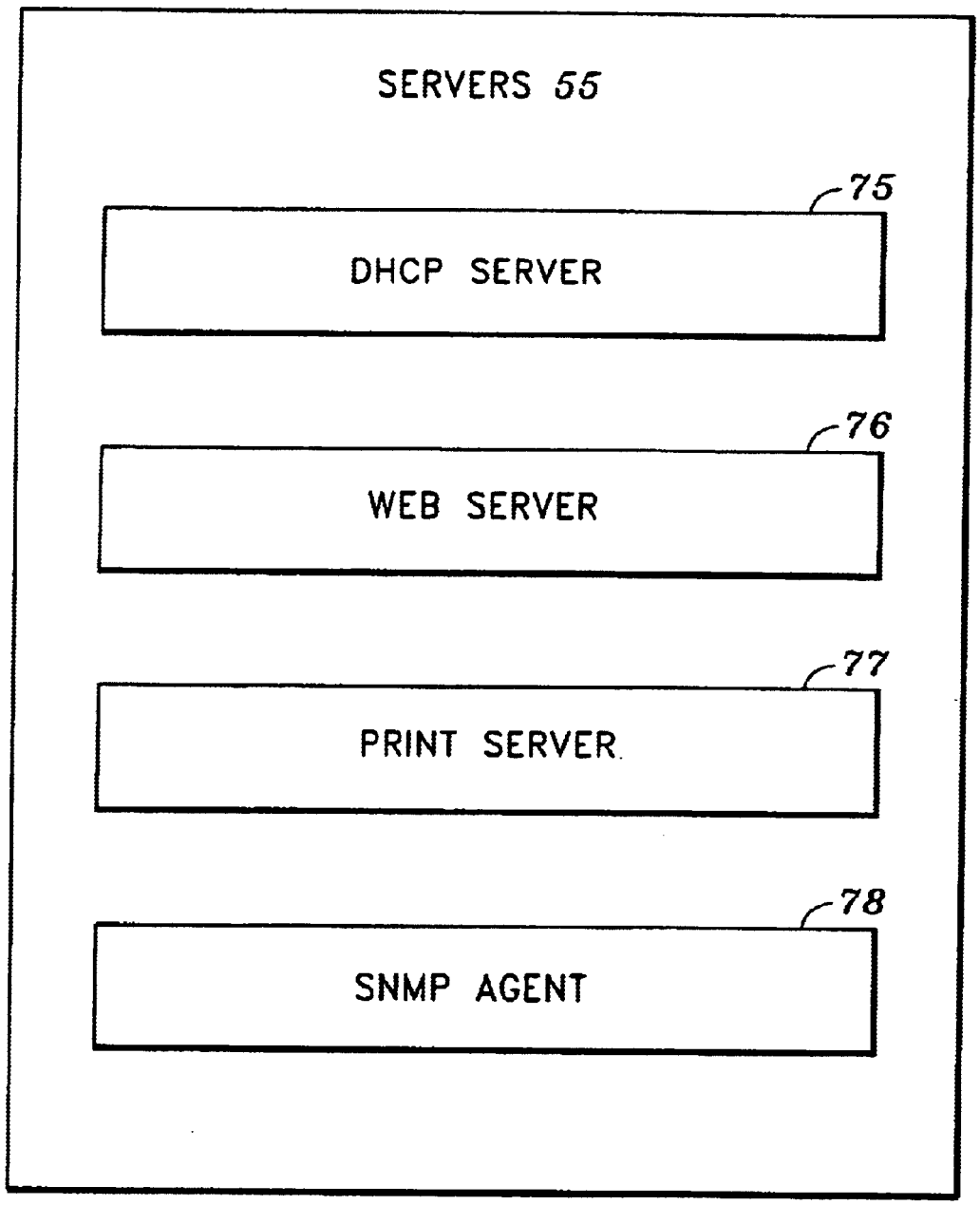
FIG. 4 is a block diagram depicting servers for use in one embodiment of the present invention.

FIG. 4 is a block diagram for explaining the contents of servers 55. As seen in FIG. 4, servers 55 includes DHCP server 75, web server 76, print server 77 and SNMP agent 78. DHCP server 75 allows network management device 20 to assign IP addresses to the plurality of printing devices which it manages, as well as to other devices on network 10. DHCP server 75 also has the capability to provide a software hook to which other modules can register. In this manner, when DHCP server 75 assigns an IP address to a printing device on network 10 and then receives an address acknowledgment message from the printing device, DHCP server 75 notifies, through the software hook, the registered software module of the IP address of printing device. This is used to trigger a discovery module to then perform targeted discovery of the printing device, as discussed more fully herein. In the alternative, network management device 20 can be configured to disable DHCP server 75 when an external DHCP server is utilized on network 10. This functionality is discussed in further detail below. Web server 76 is a typical web server and is used to publish web pages maintained by network management device 20 to other entities on network 10, such as workstations 11 and 12, or server 14. Print server 77 is a print server for managing print queues for one or more printing devices managed by network management device 20. Lastly, SNMP agent 78 allows network management device 20 to communicate with other network devices such as printing devices, over network 10 in order to send and receive network configuration information and other information related to the printing device. Preferably, SNMP agent 78 initiates SNMP communication between network management device 20 and other network devices which contain an SNMP agent for responding to the SNMP communications.

Figure 5:
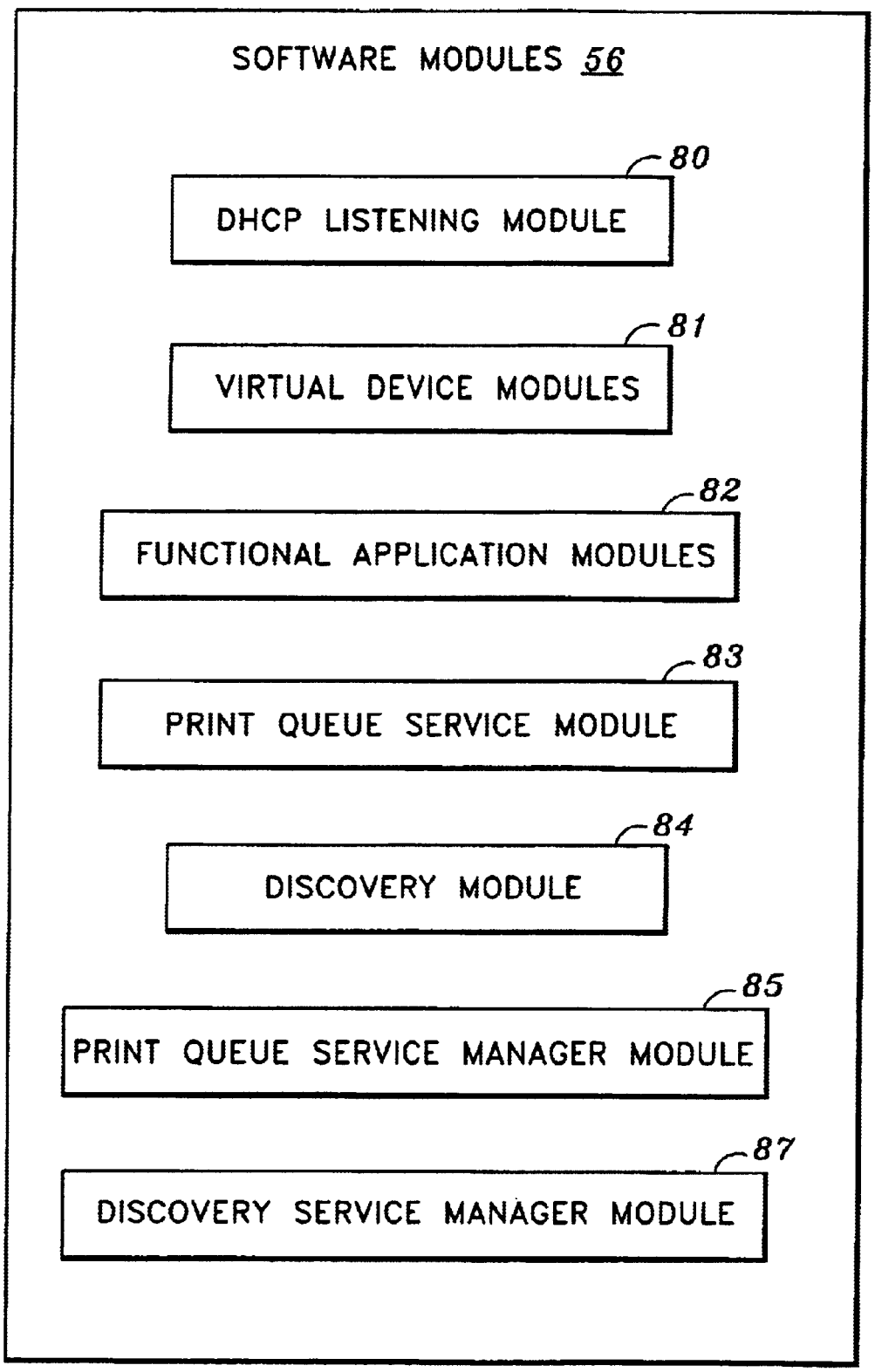
FIG. 5 is a block diagram depicting software modules for use in one embodiment of the present invention.

FIG. 5 is a block diagram for explaining the contents of software modules 56 which includes DHCP listening module 80, virtual device modules 81, functional application modules 82, print queue service module 83, discovery module 84, and print queue service manager module 85, and discovery service manager module 87. DHCP listening module 80 is a module which can be used when an external DHCP server is utilized outside of network management device 20, instead of DHCP server 75. In such a configuration, DHCP listening module 80 can be used to detect printing devices on network 10 based on the assignment of an IP address to a printing device by the external DHCP server. This functionality of DHCP listening module 80 is discussed more fully below.

Virtual device modules 81 comprise one or more virtual device module which can be initiated in correspondence to one or more printing devices supported by network management device 20 so as to extend functional capability of the printing devices. For example, a virtual device module may be executed to provide secure printing functionality on behalf of printing devices which are managed by network management device 20 and which do not have secure printing functionality embedded therein. It should be appreciated that such additional functionality can also be implemented in software without the use of a virtual device module.

Functional application modules 82 comprise modules for performing various applications such as network secure printing, and which interface with virtual device modules 81 to implement the functional services, such as secure printing, which are not directly supported by one or more printing devices managed by network management device 20. Functional application modules are discussed in more detail below. Print queue service module 83 interfaces with discovery module 84 to create a new print queue when a new printing device is discovered.

Discovery module 84 is a module which is used to perform discovery on detected printing devices on network 10 so as to obtain information regarding a printing device's network settings, and functional capabilities. Depending on the mode of operation of network management device 20, discovery module 84 can receive notification of a detected printing device through a software hook from DHCP server 75, from classic discovery methods and/or from DHCP listening module 80. The functionality of discovery module 84 and print queue service module 83 is discussed in more detail below.

Print queue service manager module 85 is a management application which allows multiple network management devices on a same network to avoid confusion regarding the detection and discovery of printing devices across the network and to distribute and share the processing load of supporting the various printing devices across the network between the multiple network management devices based on available resources of each network management device and based on the location of each network management device within the network. Print queue service manager module 85 is discussed in more detail below. In a similar fashion, discovery service manager module 87 manages the discovery modules among multiple network management devices to prevent confusion in the detection, discovery and management of printing devices. Discovery service manager module 87 also has the capability to distribute the load for performing discovery of printing devices on a given network between multiple network management devices. This functionality is discussed in more detail below.

Figure 6:
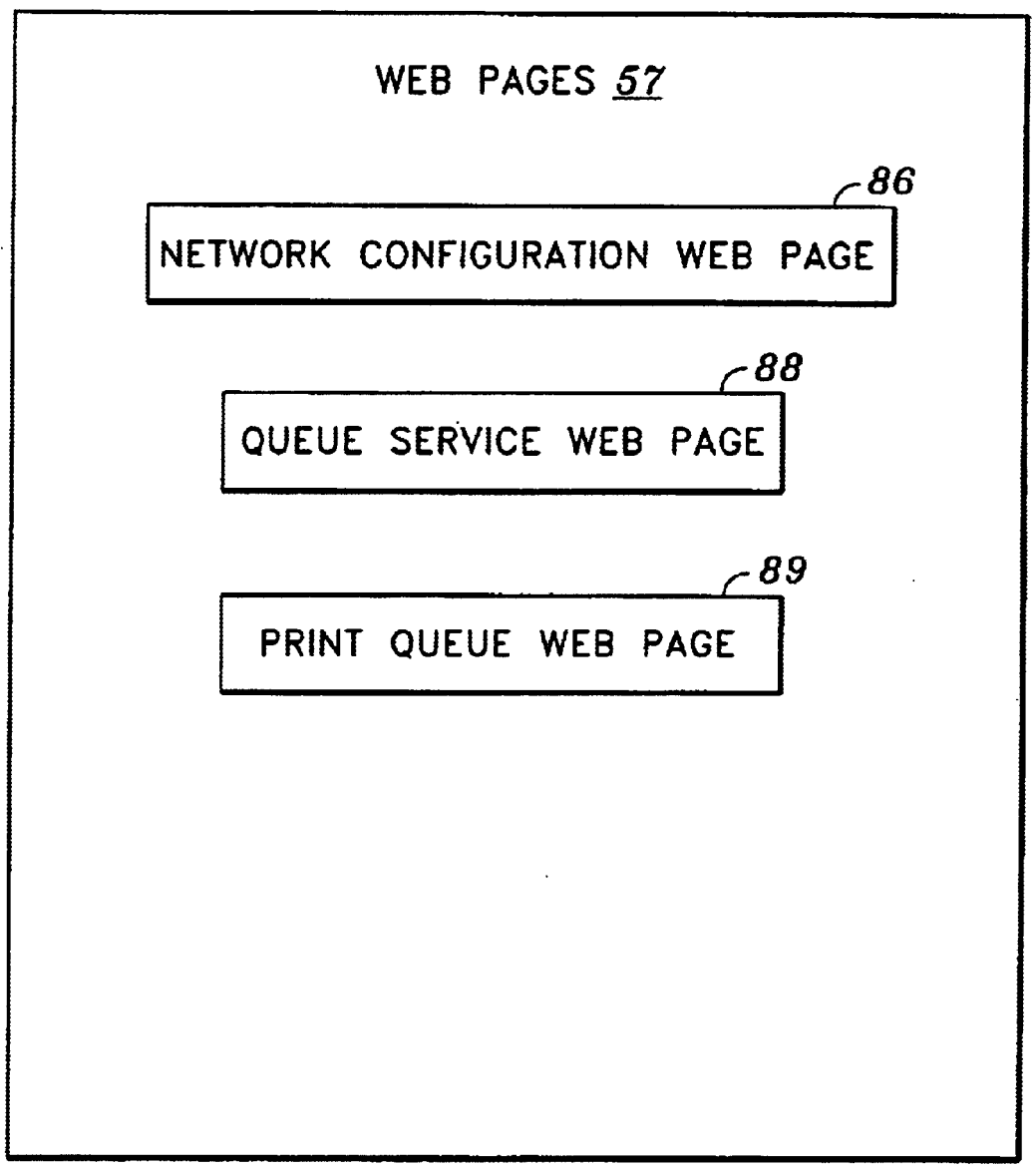
FIG. 6 is a block diagram depicting the web pages for use in one embodiment of the present invention.

Turning to FIG. 6, web pages 57 is depicted which contains network configuration web page 86, queue service web page 88, and print queue web page 89. Network configuration web page 86 allows a user, preferably a system administrator, to have a web-based interface for managing the configuration and operational parameters of network management device 20, or of multiple network management devices, at a single location. In addition, network configuration web page 86 allows a user, such as a system administrator, to configure and manage the printing devices which are managed by network management device 20. Queue service web page 88 allows a user, such as a system administrator, to access and manage the print queues for all printing devices managed by network management device 20 and by any other network management devices residing on network 10. Queue service web page 88 therefore allows a system administrator to view and manage all print queues supported by network management device 20 and other network management devices, and to view and manage print jobs within each respective print queue. Print queue web page 89 is a web page that is accessible to users of network 10, such as workstations 11 and 12, in order to publish in one location all available print queues managed by network management device 20 and any other network management devices on network 10 so that a user can quickly and efficiently find a needed print queue and can also download print driver corresponding to the printing device associated with a designated print queue.

FIG. 7 is a block diagram for explaining one of device management directories 70. As seen in FIG. 7, the device management directory is utilized for containing identification and network configuration information with respect to each printing device detected and discovered by the present invention. In particular, device management directory 70 contains a plurality of entries 90, each entry corresponding to a particular printing device which has been detected and discovered by network management device 20. Based on information discovered by network management device 20 from the respective device, a separate entry is created for the printing device and identification information related to the printing device, along with network configuration information of the printing device, is stored in the entry. For example, each of entries 90 has a field for entering the MAC address 91 of the corresponding printing device. In addition, each entry has a corresponding print device type 92 and IP address 93 for the printing device associated with the entry. Lastly, network configuration information 94 contains network-related information associated with the printing device for the respective entry, such as domain name and other network setting information. In this manner, a directory is provided for maintaining identification information and network configuration information of each printing device managed by network management device 20 for efficient access and management by a network user, such as a system administrator. When more than one network management device is present across network 10, other device management directories are created to provide a common location for maintaining identity and network configuration information for all printing devices managed by all network management devices on the network. This functionality is discussed in more detail below.

FIG. 8 is a block diagram for explaining print queue configuration directory 71. In particular, print queue configuration directory 71 contains a plurality of entries corresponding to each print queue which is created by the present invention for each printing device which is detected and discovered. When a print queue is created for a printing device, the configuration information related to the print queue is stored in an entry in print queue configuration directory 71 to maintain all print queue configuration information in a common location. As seen in FIG. 8, each entry in print queue configuration directory 71 corresponds to a separate print queue and contains information fields for IP address 100, MAC address 101, print queue name 102, printing capabilities 103 and server 105. IP address 100 contains the IP address of the printing device corresponding to the print queue entry and MAC address 101 also corresponds to the MAC address for the printing device. Print queue name 102 is a name which is detected by discovery from the corresponding printing device or, if it is not detected, a name is generated when the print queue is created. For example, print queue name 102 may comprise a name which is simply the make and model of the printing device which is discovered by network management device 20 from the printing device. In a similar fashion, printing capabilities 103 contains printing capabilities of the printing device associated with the print queue entry. For example, printing capabilities 103 can include, but is not limited to, color printing capabilities, recording sheet-size capability such as letter and/or A4, and resolution capabilities. Server 105 is the identity of the network management device which is maintaining the print queue for a given printing device. For example, in a network environment having multiple network management devices, different print queues may be distributed among the multiple network management devices in order to balance the processing throughput and memory load required to maintain the print queues.

Figure 9:
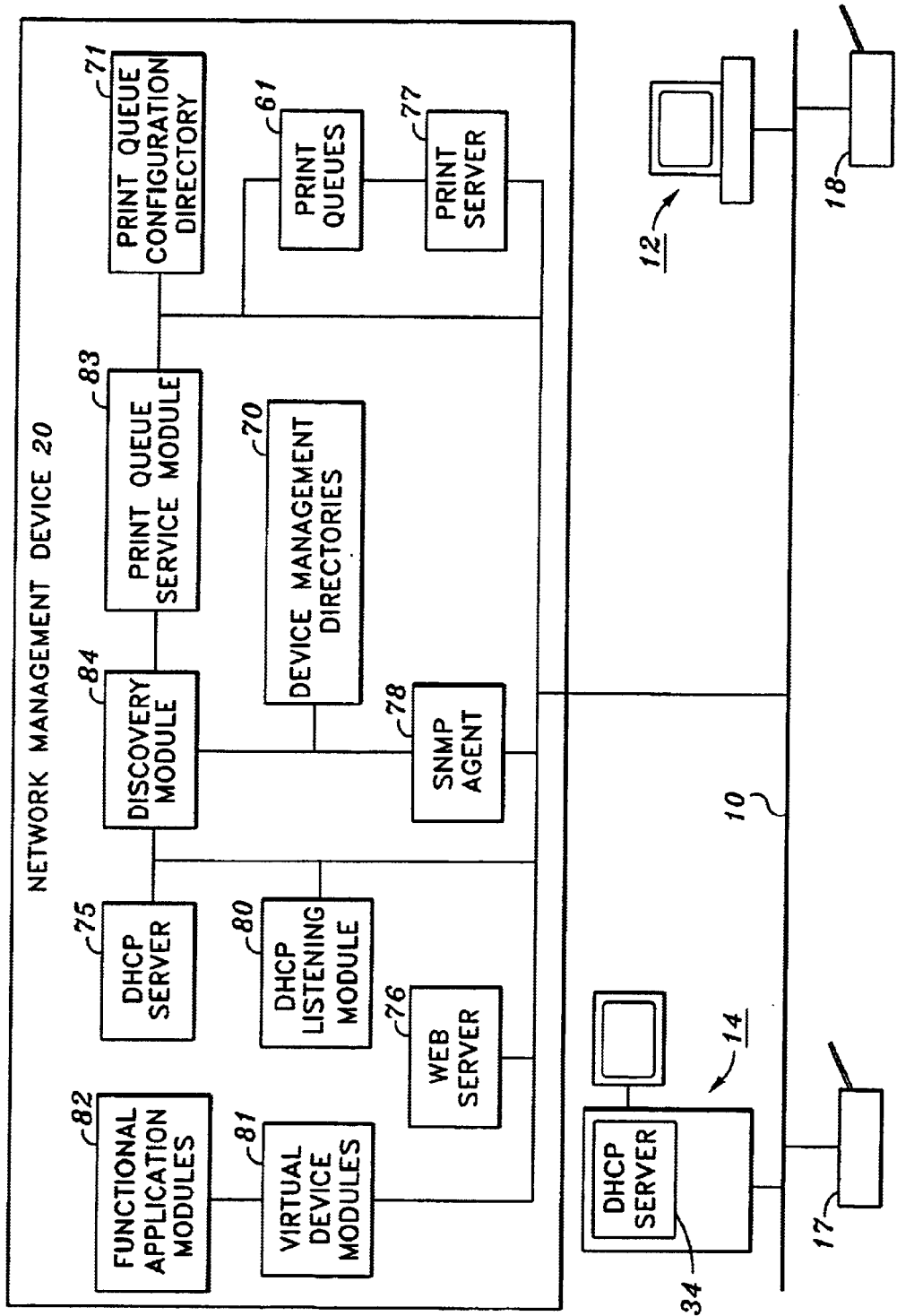
FIG. 9 is a block diagram illustrating the functionality of one embodiment of the present invention in a network environment.

FIG. 9 is a block diagram for explaining the functionality of network management device 20 in the network environment of network 10. As seen in FIG. 9, DHCP server 75 is provided in network management device 20 for supporting DHCP communications over network 10 using the DHCP protocol. In particular, DHCP server 75 can be enabled, such as by a system administrator through front panel 21, to respond to all DHCP address requests on network 10 for an IP address. In this configuration, DHCP server 75 supports a software hook to which discovery module 84 has preregistered. When DHCP server 75 receives a DHCP address request from a device on network 10, DHCP server 75 responds to the requesting device with an assigned IP address. When DHCP server 75 receives an address acknowledgment message from the requesting device, DHCP server 75 uses the software hook to notify discovery module 84 of the assignment of an IP address to the requesting device. Discovery module 84 can then determine if the requesting device is the type of network device that discovery module 84 should perform discovery on, and if so, discovery module 84 sends a discovery request message to the device to obtain information regarding the device's network settings, as well as device capabilities and configuration. A predetermined range of MAC addresses can be used by discovery module 84 to determine whether a device detected by DHCP server 75 is one for which discovery module 84 should perform discovery. In addition, a predetermined MAC address range may also be used by DHCP server 75 so that DHCP server 75 will only provide assigned IP addresses to a preferred set of network devices, such as network printers. Preferably, discovery module 84 compares the MAC address of the address acknowledgment message to the predetermined MAC address range to determine if the device is a network printer that should be discovered and managed by network management device 20.

In the alternative, network management device 20 can also be configured to disable DHCP server 75, such as by a system administrator either through front panel 21 or through network configuration web page 86. For example, when an external DHCP module is used DHCP server 75 is disabled to prevent addressing conflicts and discovery module 84 conducts classic discovery to discover all printing devices on network 10. Such classic discovery of the printing devices can include, but is not limited to, known techniques such as using broadcast discovery messages, pinging through a list of IP addresses, router table walking, and DNS lookup. For example, an SNMP broadcast discovery message can be sent and then discovery module 84 can send a targeted SNMP discovery request to each responding printing device. In the alternative, discovery module can ping through a list of IP addresses and then send a targeted SNMP discovery request to each responding printing device.

As another alternative, discovery module 84 can obtain router tables from the routers on the network and then send an SNMP discovery request to each printing device having an IP address in the routing tables. Lastly, discovery module 84 can obtain a list of assigned IP addresses from a DNS server on the network and then send an SNMP discovery request to each printing device having an IP address in the list. It can be appreciated that other known methods of discovery can be used by discovery module 84 to discover printing devices on network 10 when an external DHCP server is used instead of DHCP server 75 in network management device 20.

In addition to classic discovery methods, DHCP listening module 80 can be used to detect an IP address acknowledgment message for a new requesting printing device on network 10. In particular, DHCP listening module 80 detects DHCP address acknowledgment messages which contain an IP address for a new printing device on network 10. For example, after boot-up of network management device 20 in the configuration where an external DHCP server is utilized, discovery module 84 uses classic discovery methods as discussed above to discover the printing devices existing on network 10.

After using such classic discovery, DHCP listening module 80 can then be used to detect printing devices which subsequently become operational on network 10 by detecting the IP address acknowledgment message sent from the DHCP server to the newly incorporated printing device to the external DHCP server. In this manner, DHCP listening module 80 can be used to augment classic discovery in order to supplement the list of discovered printing devices after initial boot-up of network management device 20. DHCP listening module 80 also uses a software hook, to which discovery module 84 has preregistered, to notify discovery module 84 when a newly incorporated printing device has been detected. Discovery module 84 then initiates a discovery process for obtaining information from the newly incorporated printing device, as discussed in more detail below. DHCP listening module 80 can also use a MAC address range in order to listen only for IP address acknowledgment messages corresponding to a particular class of network devices, such as network printers.

As discussed above, when an external DHCP server is used, discovery module 84 uses classic discovery methods to discover printing devices on network 10, after which DHCP listening module 80 can be used to discover subsequently incorporated printing devices. On the other hand, when DHCP server 75 is utilized, discovery module 84 is notified through the software hook from DHCP server 75 of a detected printing device. Regardless of the manner in which discovery module 84 becomes aware of a detected printing device, discovery module 84 initiates discovery of information from the printing device. Preferably, discovery module 84 sends an SNMP information request to the detected printing device by using the IP address of the detected printing device. The detected printing device then responds with an SNMP information message to provide the requested information to discovery module 84. Discovery module 84 creates an entry for each discovered printing device in device management directory 70. As discussed above, the entry corresponding to each discovered device in device management directory 70 includes the IP address, MAC address, printing device type and network configuration information corresponding to printer 18. Discovery module 84 also notifies print queue service module 83 of each discovered printing device so that print queue service module 83 can create a new print queue for the printing device and place the new print queue in print queues 61. Print queue service module 83 also creates an entry in print queue configuration directory 71 which contains identification information for the printer, such as IP address, MAC address and printing device type, as well as a print queue name and printing device capabilities. In this manner, the network configuration of printing devices is easily managed and print queues are efficiently created and maintained for the detected printing devices.

Although the block diagram of FIG. 9 shows that network management device 20 is only using one of network interfaces 44 and 45 for connecting to network 10, another configuration is supported by network management device 20 in which one of the network interfaces is used to connect to another network, such as a local network on which only printing devices reside. In such an environment, DHCP server 75 can be configured to respond only to IP address requests from printing devices on the second local network, thereby leaving DHCP server 34 of server 14 to respond to all other IP address requests on network 10. In this manner, printing devices can be physically isolated from all other network devices on network 10 to prevent unauthorized use and managed use of the printing devices connected to the second local network through network management device 20. The functionality of this embodiment is discussed in more detail below.

As also seen in FIG. 9, web server 76 allows web pages such as those described with respect to FIG. 6, to be published over the network to network users, such as a user at workstation 12 or a network administrator at server 14. Lastly, function application modules 82 can provide network-wide functional capabilities for the printing devices managed by network management device 20 and interface with virtual device containers 81 for supporting such network applications on behalf of printing devices managed by network management device 20. For example, functional application modules 82 may include a secure printing application which allows users on network 10 to provide print jobs to printing devices managed by network management device 20 in a secure fashion. Even though the printing devices do not have the embedded functionality for supporting secure printing, virtual device containers 81 act on behalf of their respective printing devices to support such functionality. In this manner, network management device 20 is an extendable management tool for efficiently managing printing devices on a network whereby additional functionality can be added depending on the needs of the particular network.

In addition, network management device 20 can control a network device which it manages, such as a network printer, so as to reconfigure the network device for efficient operation under the management of network management device 20. For example, if a network printer is connected to network management device 20 over the local network, then network management device 20 can use SNMP messages to reconfigure the network printer. Such reconfiguration of the network printer can include, but is not limited to, instructions for the network printer to stop supporting certain protocols and to only use the protocol which network management device 20 uses to communicate with the network printer.

Figure 10:
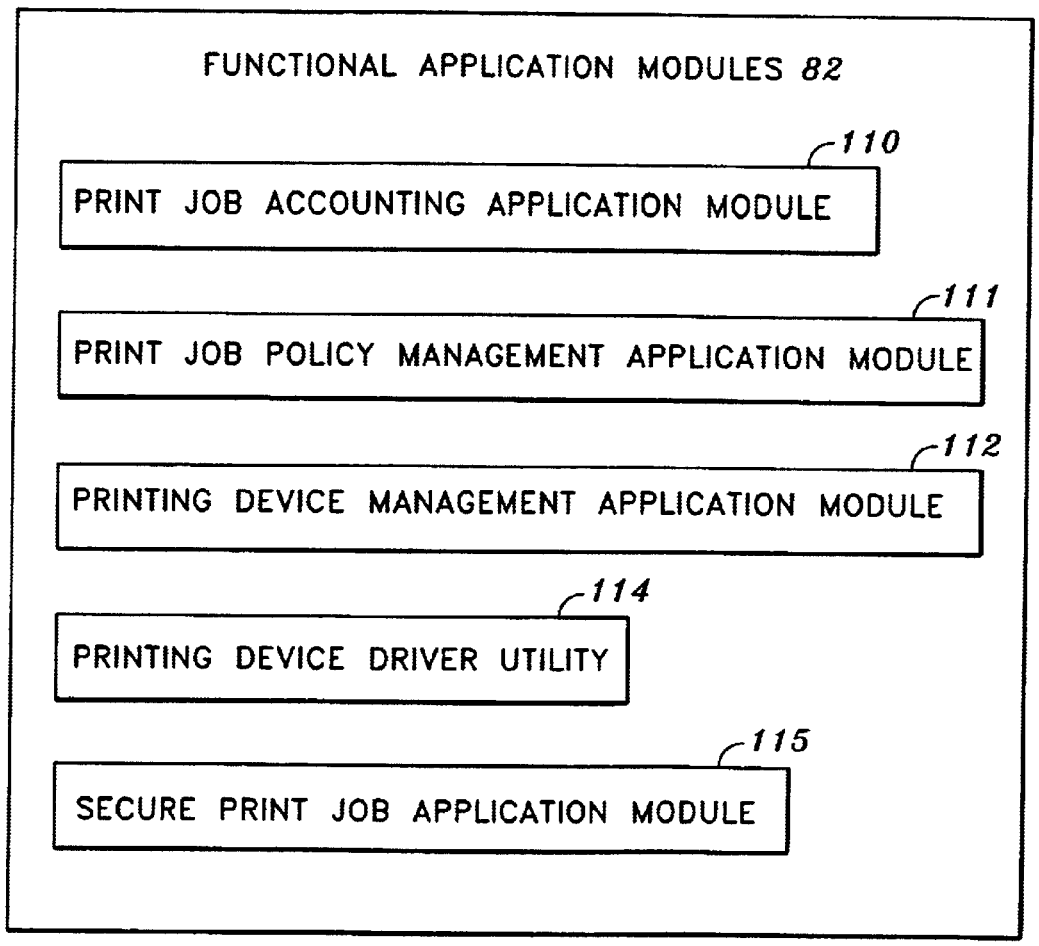
FIG. 10 is a block diagram depicting functional application modules for use in one embodiment of the present invention.

FIG. 10 provides a block diagram for explaining the contents of functional application modules 82. As previously discussed above, functional application modules 82 are used to operate in conjunction with virtual device modules 81 to support additional functional capabilities for the printing devices managed by network management device 20. In this manner, a legacy printing device which does not support a new network application, such as secure printing, can appear to other devices on the network as if it supports the new application. Turning to FIG. 10, functional application modules 82 includes print job accounting application module 110 for tracking print jobs directed to printing devices managed by network management device 20, maintaining accounting information related to the print jobs, where the information may be sorted by network user, and exporting the information for use by a print job accounting client.

Functional application modules 82 also includes print job policy management application module 111 which can be used to control access to, and allowed functionality, for each printing device managed by the network management device 20. This control can preferably be modified by settings provided by the system administrator. Printing device management application module 112 is used to provide and support a user interface, such as a user interface on workstations 11 and 12 or server 14, for a user such as a system administrator to access and manage the network configuration of the network management device 20 and the printing devices managed by network management device 20, such as those having entries in device management directory 70. Printing device driver utility 114 maintains an appropriate print driver for each of the printing devices managed by network management device 20. Preferably, a network user can access and download the print drivers from printing device driver utility 114, such as using print queue web page 89. In addition, printing device driver utility 114 preferably obtains the appropriate print drivers over the internet, such as from web pages of manufacturers for the corresponding printing devices. For example, printing device driver utility 114 can use a separate, generic internet download module to obtain such print drivers. Secure print job application module 115 is a module for supporting the secure submission of print jobs for a printing device managed by network management device 20, and for authorizing the secure printing of the print job to the printing device.

Turning to FIG. 11, services directories 72 is seen to include local services directory 120 and global services directory 121. In general, services directories 72 are useful in a network environment where there are many network devices, such as network printers, to manage. In such an environment, it is preferable to have multiple network management devices across the network enterprise. The multiple network management devices preferably act in a coordinated fashion for fault tolerance and load sharing, so as to determine which network management device will support a particular functional service. For example, only one of the multiple network management devices on a given subnet should have the responsibility of detecting and discovering network devices on the subnet to avoid confusion regarding assignment of IP addresses and the like. In addition, load balancing considerations may suggest that it is desirable to have one or more of the other multiple network management devices perform other functional services for the printing devices on the subnet, such as print queue creation and management. Accordingly, it is preferable to use service directories to allow each network management device, and the functional services which they execute, to find which one of the multiple network management devices maintains and executes a particular functional service.

Generally, local services directory 120 contains an entry for each functional service maintained by a particular network management device for a subnet. An example of such a local functional service is the discovery service for that subnet. Global services directory 121 contains an entry for each functional service that is global in nature. For example, global services directory 121 can recognize the existence of each network management device and includes entries for a global information service for obtaining information of all network devices managed by all network management modules across the network, and a load balance service for balancing services across all network management modules across the network.

As seen in FIG. 11, both local services directory 120 and global services directory 121 have a similar format, although other formats are possible. The format consists of multiple entries organized by the fields of subnet id 122, service 124, and network management device id 125. Local services directory 120 supports identification of the services supported by one or more network management devices on a particular network segment such as a subnet. It should be appreciated that FIG. 11 represents just one example of a format for services directories 72 and that other formats are possible. For instance, the subnet id may comprise the actual subnet address and mask instead of a representative number. In addition, the identifier under the service field may be a universally unique identifier for uniquely identifying each particular service instead of using a general description. Lastly, the nmd id for each network management device may be the actual address of the network management device.

As seen in FIG. 11, local services directory 120 corresponds to a network segment named subnet 1, as reflected by the subnet values therein. In addition, the entries in local services directory 120 indicate that discovery services for subnet 1 are provided by a network management device having a nmd id of 1, and that print queue services for subnet 1 are provided by a network management device 20 having a nmd id of 2. In this manner, two network management devices on subnet 1 share the responsibilities of providing the necessary services for the printing devices in that subnet.

In a similar fashion, it can be seen that global services directory 121 indicates globally supported services and the respective network management devices that provide such services. Global services directory 121 reflects the services that are accessible to all network management devices across all network segments (subnets) in a large, complex network. For example, it can be seen from global services directory 121 that the print queue for subnet 1 is performed by nmd 1, that the discovery service manager resides on nmd 3, and that the global information service resides on nmd 1. In this manner the services provided by multiple network management devices in a large network environment are published in a distributed fashion between local and a global levels. The use and functionality of local services directory 120 and global services directory 121 is discussed further below with respect to network environments having multiple network management devices.

FIG. 12 is a block diagram for explaining an extended version of global services directory 121 and is similar to the version depicted in FIG. 11, with certain exceptions. First, the global services directory 121 of FIG. 12 describes additional services for each subnet. As seen in FIG. 12, global services directory 121 also includes an entry for subnet 1 to indicate that the master device for subnet 1 is network management device 1. In addition, an entry is provided to indicate that the discovery service manager is maintained by network management device 3. An entry is also provided to indicate that the global information service is maintained by network management device 1. Lastly, an entry is provided to indicate that the print queue service manager is supported by network management device 3. In this manner, all global functional capabilities are easily accessed.

Figure 13A:
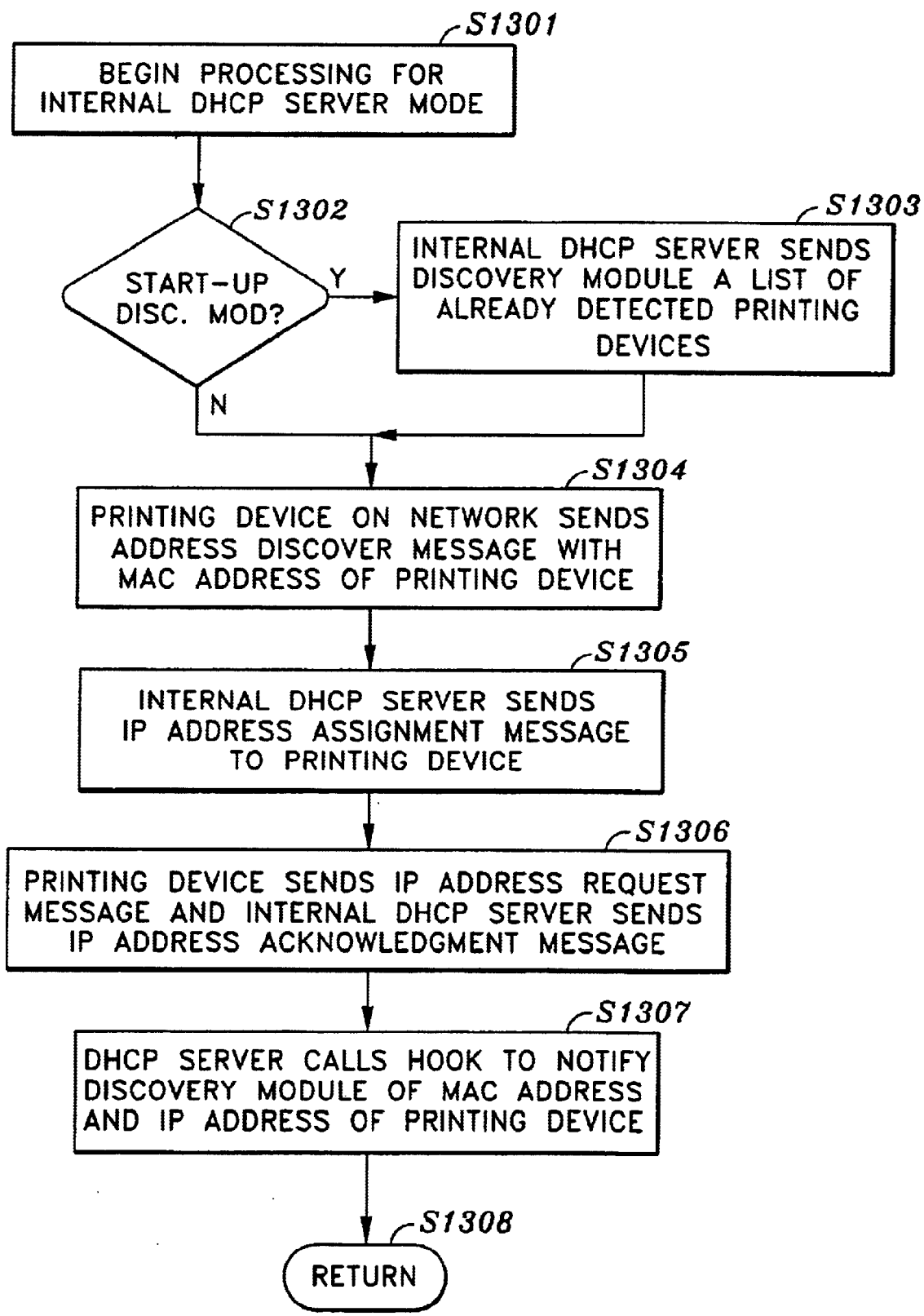
FIGS. 13A, 13B and 13C are flowcharts for explaining the discovery of printing devices according to one embodiment of the present invention.

FIG. 13A provides a flowchart for explaining the process of detecting printing devices on network 10 when network management device 20 is configured to use internal DHCP server 75 to assign IP addresses on network 10. In step S1301, the processing for detecting printing devices on network 10 begins. In step S1302, it is determined if start-up of discovery module 84 has just been initiated. If so, flow passes to step S1303 in which internal DHCP server 75 passes to discovery module 84, through a software hook, a list of printing devices for which DHCP server has already assigned IP addresses since the boot-up of network management device 20. In this manner, discovery module 84 does not miss any printing devices which may obtain IP addresses from DHCP server 75 in the early moments after start-up of network management device 20. Flow then passes to step S1304. If start-up of discovery module 84 has not just occurred, then flow passes to step S1304 in which a printing device on network 10 sends a DHCP discover request message for an IP address, wherein the DHCP discover request message contains the MAC address of the requesting printing device. Internal DHCP server 75, being the active DHCP server on network 10, responds to the request by sending an DHCP address assignment message containing an IP address to the requesting printing device (step S1305). The printing device then sends a DHCP address request message to DHCP server 75 to request that the received IP address be registered for the printing device, after which DHCP server 75 responds with an IP address acknowledgment message to the printing device (step S1306). In step S1307, DHCP server 75 calls a software hook, to which discovery module 84 has previously registered, to notify discovery module 84 of the printing device which has just acknowledge an assigned IP address. The MAC address and the assigned IP address are provided to discovery module 84 through the hook. Flow then passes to return in step S1308. In this manner, internal DHCP server 75 is utilized to inform discovery module 84 of detected printing devices on network 10 when DHCP server 75 is acting as the only DHCP server on network 10.

Figure 13B:
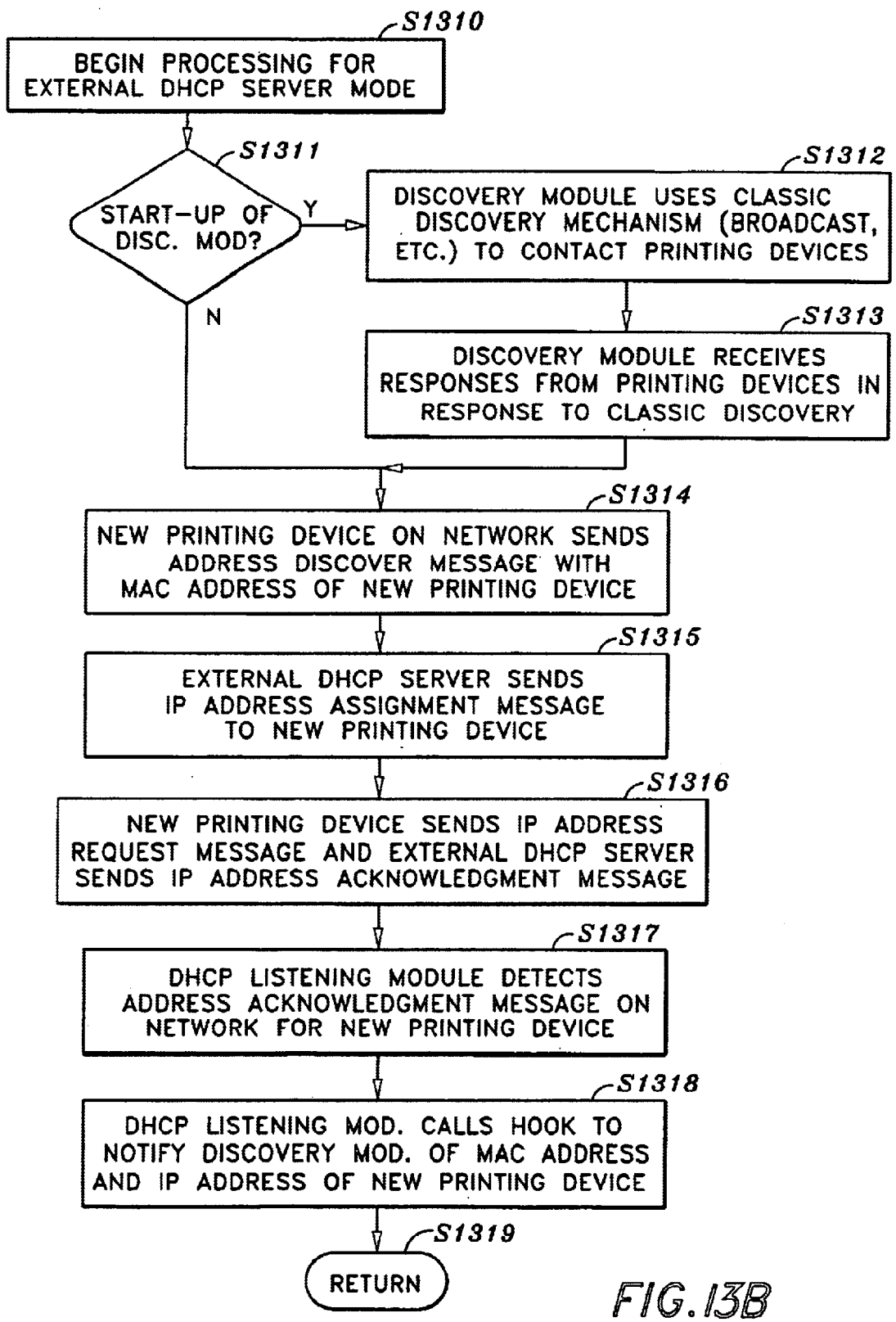

FIG. 13B provides a flowchart for explaining the process of detecting printing devices on network 10 when network management device 20 is configured to disable internal DHCP server 75 and an external DHCP server is used to assign IP addresses on network 10. In this mode, DHCP server 75 is not active and therefore cannot be used to inform discovery module 84 of detected printing devices on network 10. Accordingly, as discussed above with respect to FIG. 9, classic discovery mechanisms are used to perform initial discovery of existing printing devices on network 10, after which DHCP listening module 80 is used to efficiently detect printing devices which are subsequently incorporated onto network 10. In step S1310, processing begins for detecting printing devices on network 10. In step S1311, it is determined if start-up of discovery module 84 has just been initiated. If so, flow passes to step S1312 in which discovery module 84 uses a classic discovery mechanism, such as broadcasting, pinging, router table walking, and DNS look-up, as discussed with respect to FIG. 9. Whichever discovery mechanism is used, discovery module 84 receives responses from printing devices on network 10 which confirms the existence and identity of each printing device (step S1313) after which flow passes to step S1314. In this manner, classic discovery mechanisms are used at boot-up of network management device 20 to detect printing devices on network 10 which have already obtained an IP address from an external DHCP server. If it is determined in step S1311 that start-up of discovery module 84 has not just been initiated, flow passes to step S1314.

Once classic discovery is used to detect all existing printing devices on network 10, DHCP listening module 80 can be used to efficiently detect any printing devices which are subsequently incorporated into network 10. DHCP listening module 80 detects these printing devices by sniffing the traffic on network 10 for any DHCP address acknowledgment message which indicates that a device has just received an IP address. In step S1314, a newly incorporated printing device on network 10, such as one that has just been brought online, sends a DHCP address discover message for an IP address, wherein the request includes the MAC address of the requesting printing device. In step S1315, the external DHCP server sends a DHCP address assignment message with an IP address to the requesting printing device. The requesting printing device then sends a DHCP request message to the external DHCP server to request registration of the assigned IP address for the printing device, after which the external DHCP server sends a DHCP address acknowledgment message to the printing device (step S1316). DHCP listening module 80 detects the presence of the DHCP address acknowledgment message on network 10 in step S1317. DHCP listening module then uses a software hook, similar to that previously discussed with respect to DHCP server 75, to notify discovery module 84 of the printing device corresponding to the detected DHCP address acknowledgment message (step S1318). The hook preferably provides discovery module 84 with the MAC address and IP address of the detected printing device. In addition, discovery module 84 preferably preregisters with DHCP listening module 80 to use the software hook. Flow then passes to return in step S1319.

Figure 13C:
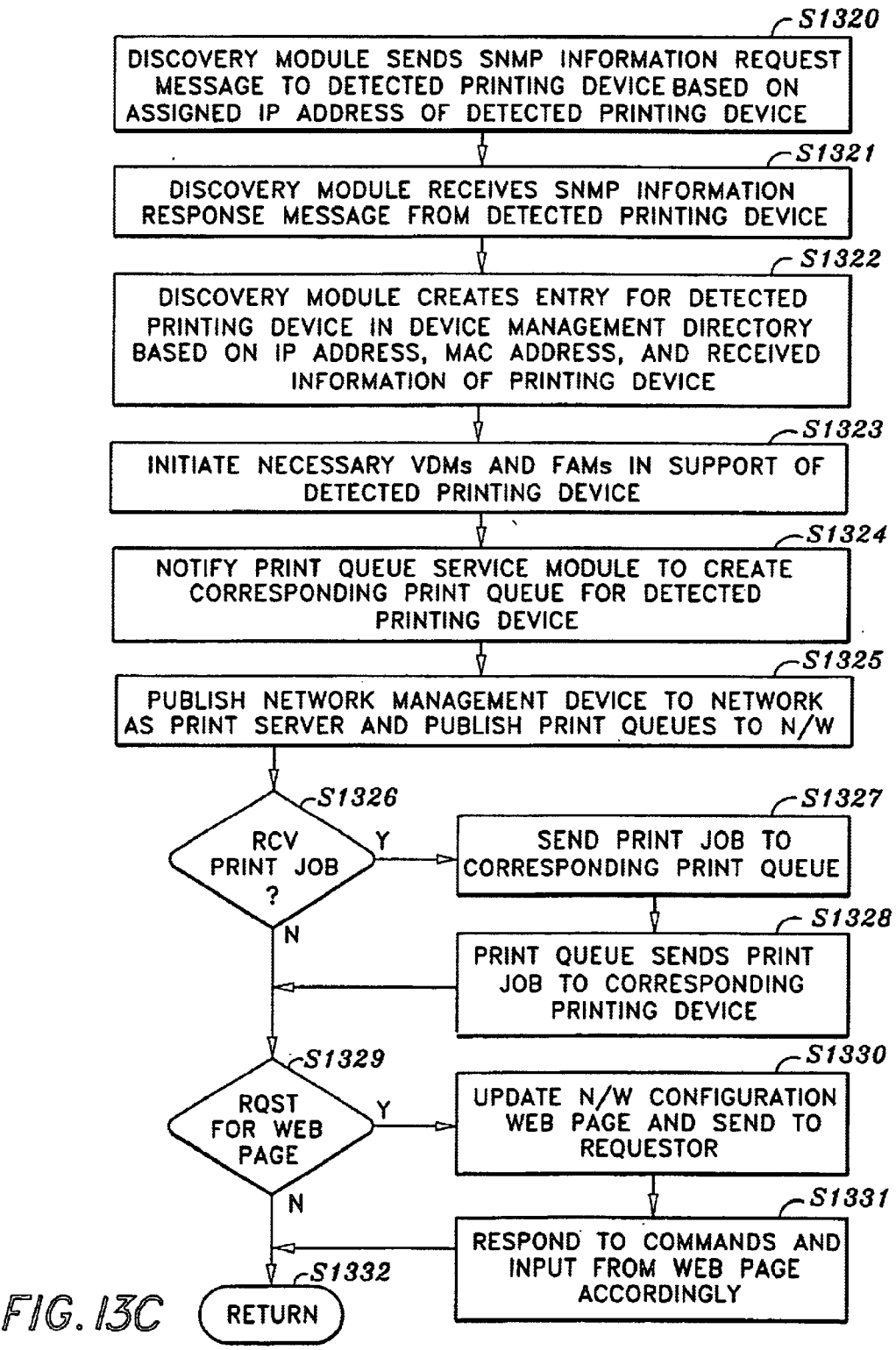

FIG. 13C provides the functionality of network management device 20 once printing devices have been detected, regardless of whether an internal or external DHCP server is used to assign IP addresses to devices on network 10. In the example depicted in FIG. 13C, SNMP is used to communicate between network management device 20 and printing devices on network 10 to conduct discovery. It should be appreciated that other known protocols and mechanisms can be used to obtain information regarding the network settings, configuration and functional capabilities of each printing device. In step S1320, discovery module 84 sends an SNMP information request message over network 10 to the printing device, such as printer 18, corresponding to the IP address contained in the detected DHCP IP address assignment message (step S1320). Next, in step S1321, discovery module 84 receives from printer 18 (the detected printing device in this example) an SNMP information response message in response to the SNMP information request message. The SNMP information response message contains information corresponding to printer 18 such as the MAC address, IP address, printing device type, and other network configuration information.

In step S1322, discovery module 84 creates an entry in device management directory 70 for printer 18, the detected printing device. The entry includes the MAC address, IP address, printing device type, and other network configuration information received from printer 18 in the SNMP information response message. In this manner, printing devices on network 10 are detected and discovered by network management device 20 based on the conventional IP address request issued by network devices at initialization. Accordingly, no special software or hardware is required on the part of the printing devices to support the automatic detection and discovery function of the network management device 20.

Next, the execution of any necessary or desired ones of virtual device modules 81 and functional application modules 82 is initiated, thereby providing additional functional capabilities for the detected and discovered printing device (step S1323). Print queue service module 83 is also notified for creation of a print queue for the detected printing device, thereby placing the print queue in print queues 61 and creating an entry in print queue configuration directory (step S1324). The network management device 20 is published to network 10 in step S1308 as a print server with modified print queues 61 containing the new print queue corresponding to the detected printing device (step S1325).

Once a printing device has been discovered and network management device 20 has been configured properly to manage requests for services from the printing device, network management device 20 is capable of handling such requests for services. In step S1326, it is determined if network management device 20 has received a print job from one of the network devices on network 10, such as workstation 12, which is directed to a printing device having a corresponding print queue in print queues 61. If so, the print job is directed to the appropriate one of print queues 61 in step S1327. The print job is then eventually sent from the print queue to the corresponding printer device in accordance with the rules and policy of the print queue (step 1328). If it is determined in step S1326 that a print job has not been received, flow passes directly to step S1329. In step S1329, it is determined if a request has been received from a network user for network configuration web page 86 for access and management of network management device 20 and of all printing devices managed by network management device 20. If a request has been received, network configuration web page 86 is updated based on the entries in device management directory 70 and sent to the workstation of the network user, such as a system administrator (step S1330). Network management device 20 then responds to any management commands provided by the network user through network configuration web page 86 (step S1331). Flow then passes to return in step S1332. If it is determined in step S1329 that a request for network configuration web page 86 has not been received, flow passes directly to return in step S1332.

Figure 14:
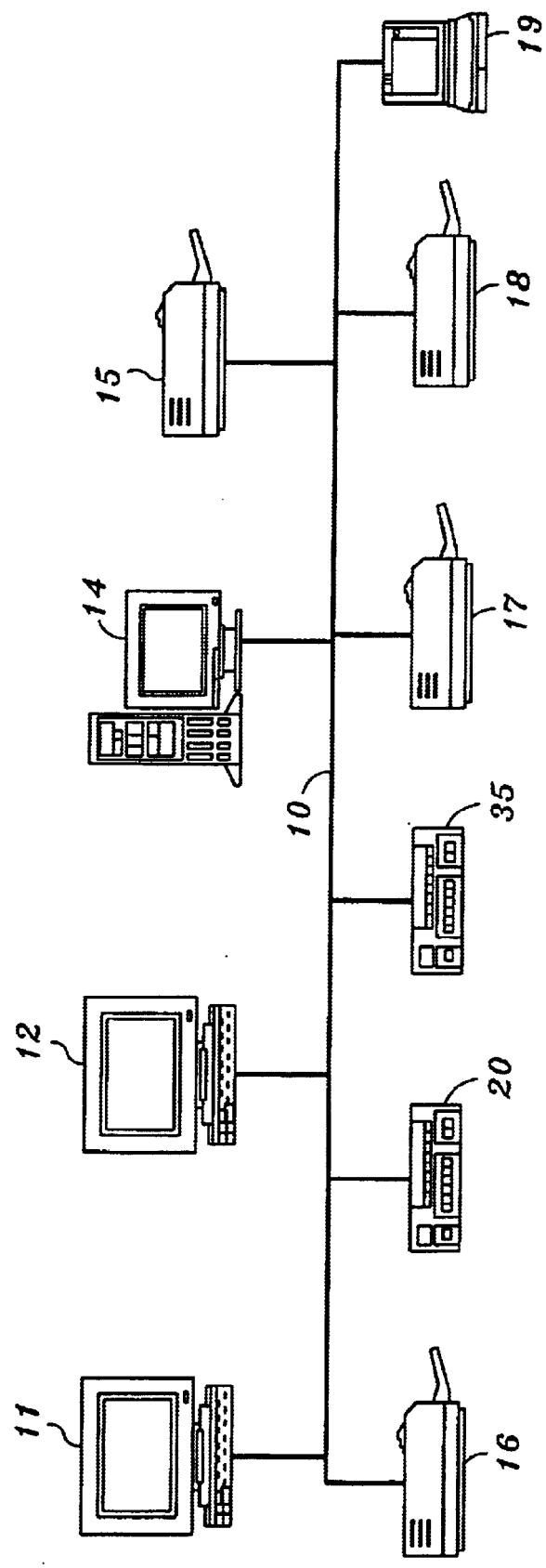
FIG. 14 is a depiction of a network environment having multiple network management devices according to one embodiment of the present invention.

FIG. 14 is a block diagram for explaining a network environment in which two network management devices are connected to the network. As discussed above with respect to FIG. 1, the network environment includes network 10, workstations 11 and 12, laptop 19, server 14, printers 15, 16, 17 and 18, and network management device 20. In addition, second network management device 35 is also connected to network 10. Both network management device 20 and second network management device 35 generally operate as described above with respect to FIGS. 1 to 13. In such a network environment as depicted in FIG. 14 both network management devices must acknowledge each other's presence on the network in order to avoid confusion and redundancy with respect to discovery and management of printing devices on network 10.

In this regard, each network management device can discover the presence of the other network management device by one of two ways. First, a network administrator may manually enter the IP address of the other network management device on the front panel of each network management device or via a user interface on a workstation. In the alternative, each network management device sends out an announcement message on a periodic basis to publish its presence on the network to other network devices. Preferably, the announcement message is a multicast message which contains the name of the network management device, and the IP address, MAC address, version, service manager status, directory status, number of discovered devices for the network management device. The multicast message can also include the time that the network management device has been in service and a resource availability indicator for the network management device. One of network management device 20 and network management device 35 can then be designated as a master device and the other designated as a slave device. The master device can then determine, based on a set of policies and rules, which of the two network management devices should support certain services for the printing devices in network 10. For example, network management device 20 may be designated as the master device and may determine that network management device 20 should only perform discovery services for network 10 and that network management device 35 should only perform print queue services for network 10. In this manner, the discovery and management of the printing devices on network 10 is efficiently distributed between the two network management devices and network confusion and redundancy is reduced.

Figure 15:
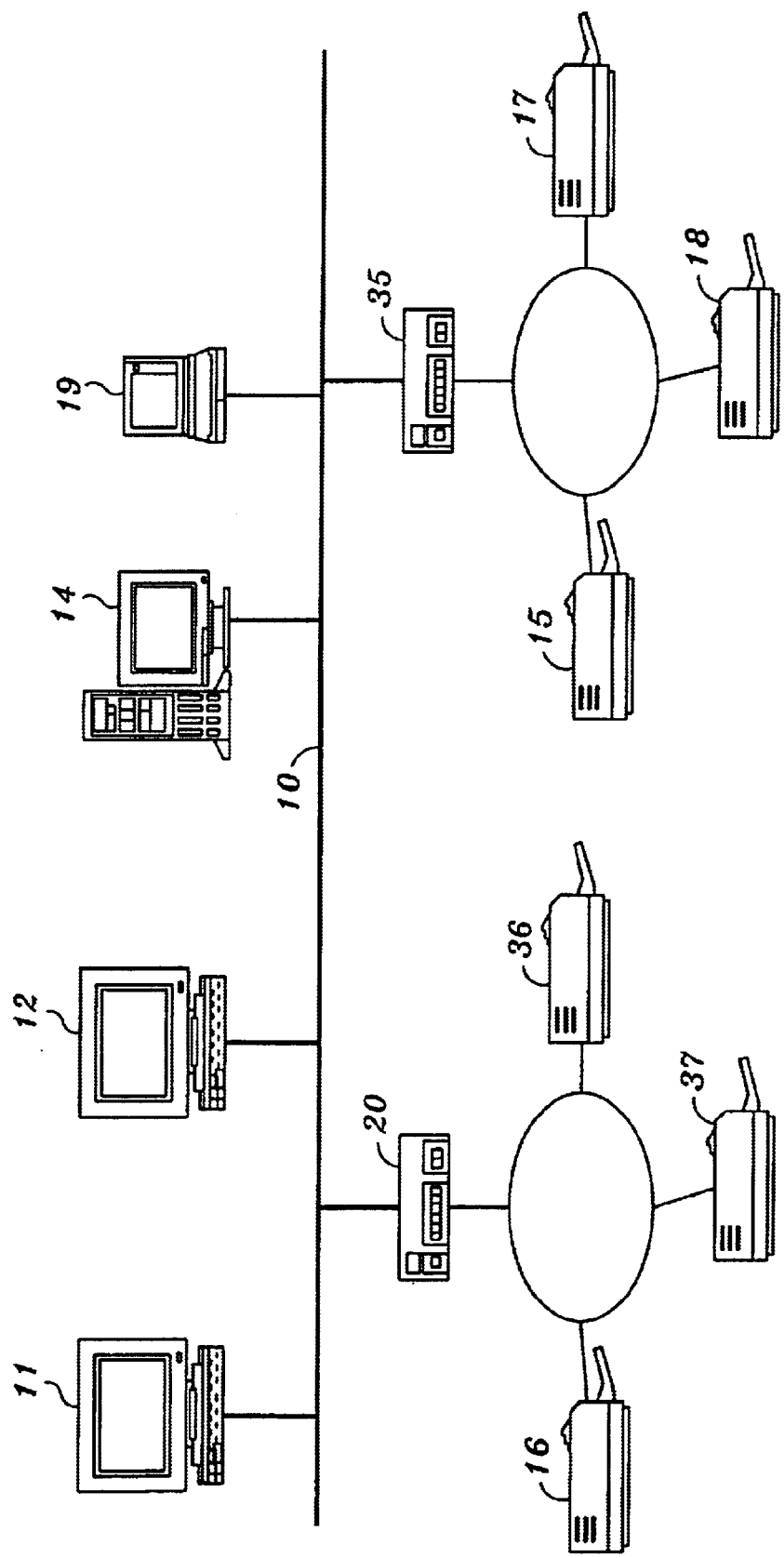
FIG. 15 is a depiction of a network environment having multiple network management devices according to one embodiment of the present invention.

FIG. 15 depicts a network embodiment similar to that of FIG. 14, except that the printing devices are isolated from network 10 by being separated into two groups, each of which is connected to the second network port of each respective network management device. As discussed above, network management device 20 has network interface 44 and network interface 45 so that network management device 20 may be connected to two separate networks at once. Accordingly, each group of printers in FIG. 15 is connected by an isolated local network to the second network port of a respective network management device. In this example, the DHCP server of each network management device must actively respond to the IP address requests of the printing devices on the local network of the respective network management device, because the printers are not visible to network 10. The DHCP server of each network management device can use local IP addresses for the printers on its local network, thereby saving valuable IP addresses for use on network 10. In the network environment of FIG. 15, users on network 10 are prevented from accessing the printers directly and must go through the respective network management device to use them. Network security and policy problems can thereby be reduced.

Each of the network management devices in FIG. 15 operate as described above with respect to FIGS. 1 to 13. In addition, the master/slave designations described above with respect to FIG. 14 are only relevant to the network management devices in FIG. 15 for purposes of discovery and print queue management on network 10. With respect to the local network of each network management device, the respective network management device is the only device visible to the group of printers on the local network and therefore supports both discovery and print queue management services for the local network.

Accordingly, if a network user of workstation 11 on network 10 submits a print job for one of the printers, such as printer 16, the print job is directed to the print server of network management device 20. The print job is then placed in the appropriate print queue maintained by network management device 20 and then passed from the print queue to the corresponding printer on the local network of network management device 20.

Figure 16:
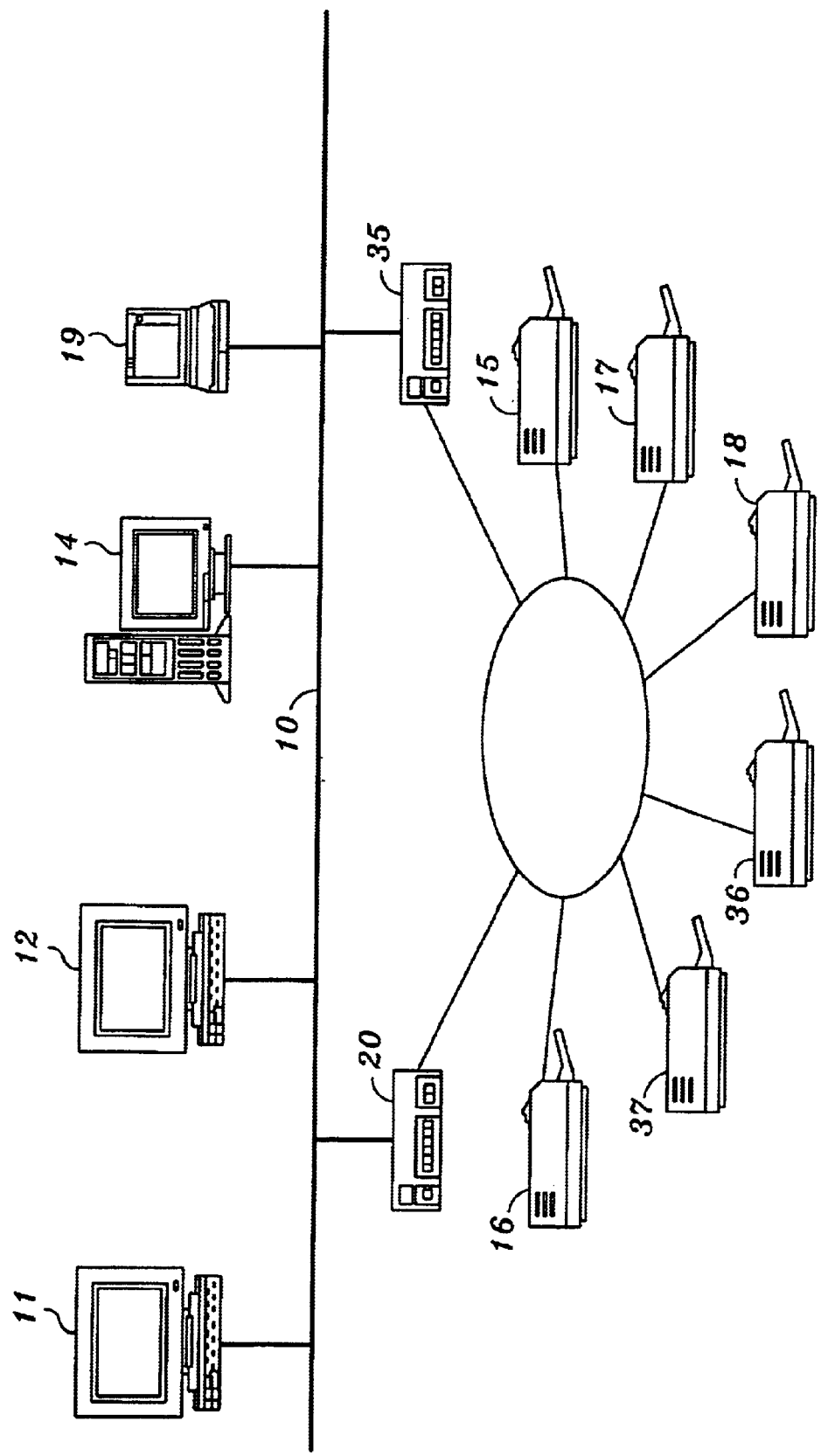
FIG. 16 is a depiction of a network environment having multiple network management devices according to one embodiment of the present invention.

FIG. 16 depicts a network environment similar to that of FIG. 15 except that both network management device 20 and network management device 35 are connected to a single local network via their second network interface ports, and all printers reside on the single local network. Accordingly, the master/slave relationship between the two network management devices for managing the services for network 10 is also used for managing the services for the single shared local network on which the printers reside. It can be appreciated that the allocation of services between the two network management devices for network 10 may be different than the allocation of services between the two network management devices for the shared local network.

Figure 17B:
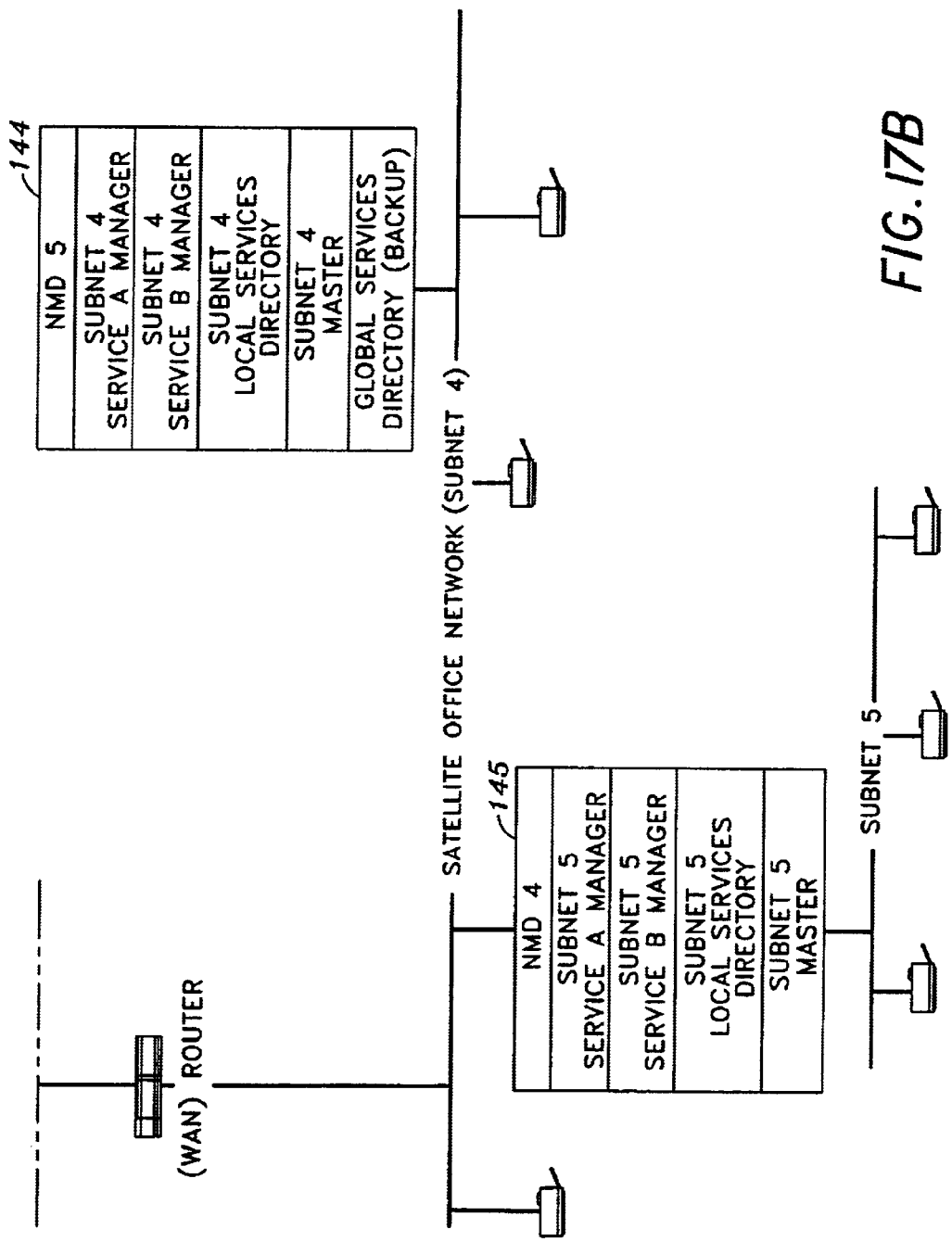
FIG. 17 is a block diagram for explaining the use of multiple network management devices in a network environment according to one embodiment of the present invention.

In this regard, FIG. 17 provides a block diagram for explaining the master/slave relationship of multiple network management devices in a distributed network environment, and the allocation of services for each network segment (subnet) in the network environment. Turning to FIG. 17, it can be seen that the distributed network environment is comprised of network 10 (subnet 1), which is the enterprise backbone on which network management devices 20 (nmd 1), 141 (nmd 2) and 142 (nmd 3) reside. The network environment also includes subnet 2 which is a shared local network between network management devices 20 and 141, and subnet 3 which is a local network of network management devices 142. Subnet 4 is a physically removed network segment which represents a satellite office network which is connected to network 10 by a router. Network management devices 144 (nmd 5) and 145 (nmd 4) reside on subnet 4 and network management device 145 is connected by its second network interface to subnet 5.

It can be appreciated from a review of FIG. 17 that some of the network management devices are connected via their first network interface to a subnet which is shared with other network management devices, some of the network management devices are connected via their second network interface to a subnet which is shared with other network management devices, and some of the network management devices are connected via their second network interface to a subnet which is not shared with any other network management device. Accordingly, the services for each of the subnets that a particular network management device is connected to are allocated in a different fashion.

For example, it can be seen that the services for subnet 2 are distributed such that network management device 20 is the discovery manager (service A manager) and network management device 141 is the print queue service manager (service B manager). In addition, network management device 20 maintains a local services directory for subnet 2 as described above with respect to FIG. 11. A backup copy of the local services directory is also maintained by network management device 141 for fault recovery in the event of failure of network management device 20. It can also be seen that network management device 141 has been designated as the master device for subnet 2, and can reallocate the distribution of services for subnet 2 based on changes in subnet 2 or in allocation policy.

Network management device 142 is the only network management device for subnet 3 and therefore is the service manager for all services on subnet 3, maintains the local services directory for subnet 3 and is the master device for subnet 3. Subnet 1 (network 10) has three network management devices residing on it, however it can be seen that network management device 141 does not have any direct responsibility for subnet 1, but does maintain the global services directory for the entire network environment of FIG. 17. Network management device 141 obtains copies of the local service directory information for all other subnets to maintain the global services directory.

Network management device 20 is the master device for subnet 1 and also maintains the local services directory for subnet 1. Network management device 142 is tasked with managing both discovery and print queue services for subnet 1. Network management device 144 acts as the sole network management device for subnet 4 and therefore manages both discovery and print queue services for subnet 4, maintains the local services directory for subnet 4 and is the master device for subnet 4. Network management device 144 also maintains a backup global services directory in the event that network management device 141 experiences a failure. Similar to network management device 144, network management device 145 is the sole network management device for subnet 5 and therefore manages both discovery and print queue services for subnet 5, maintains the local services directory for subnet 5 and is the master device for subnet 5.

It can be appreciated that the local services directory for each subnet is an efficient means for each network management device on the subnet to find out which network management device supports a particular service for the subnet. Similarly, the global services directory provides an efficient means for all network management devices on the subnet to find out which network management device supports a particular service for a particular subnet.

FIG. 18 provides a block diagram in tabular form for showing the services and directories allocations discussed above with respect to the network management devices shown in FIG. 17. The states of the services and directories for each subnet to which each network management device is connected are shown in FIG. 18.

Figure 19:
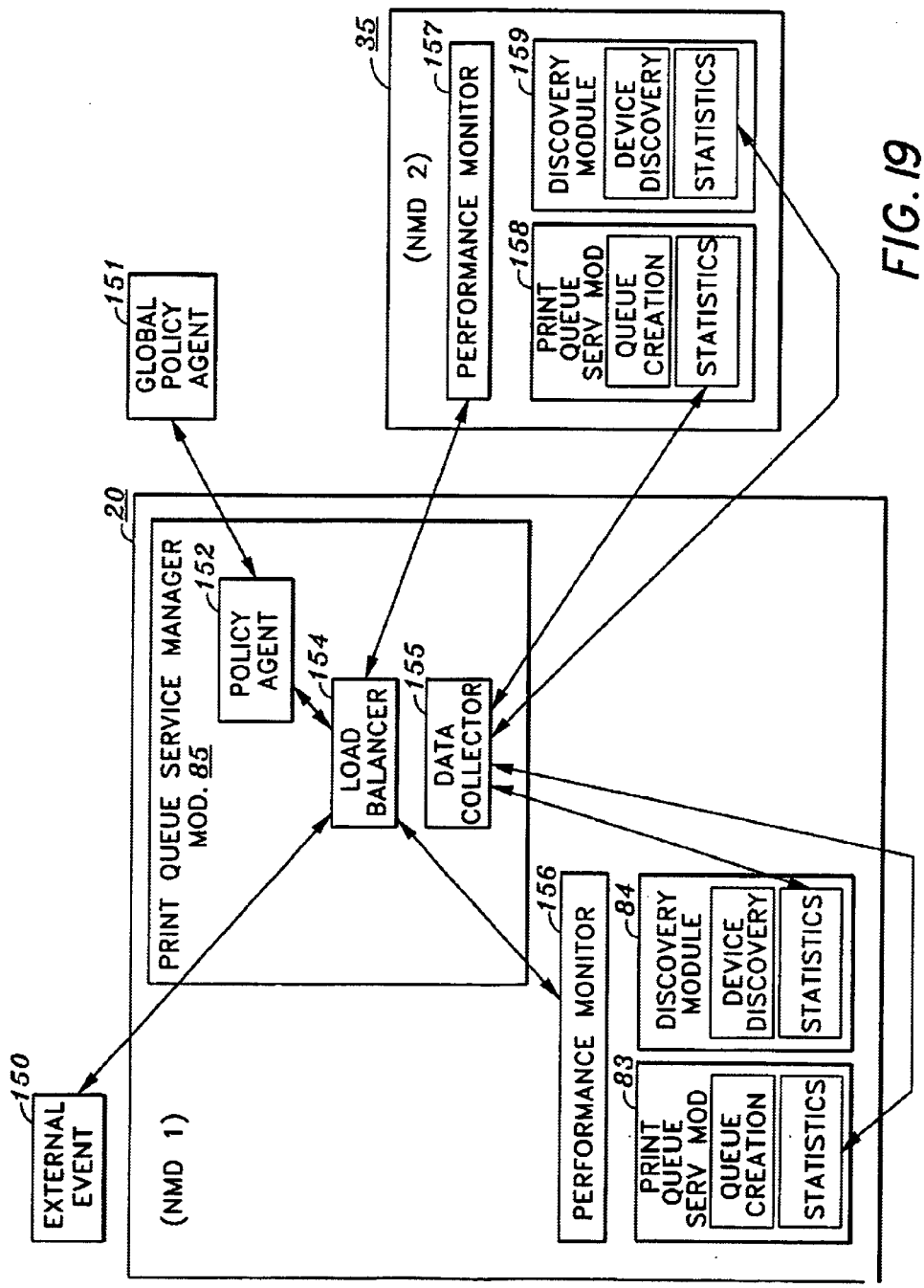
FIG. 19 is a block diagram for explaining the use of a print queue service manager according to one embodiment of the present invention.

FIG. 19 is a block diagram for explaining the functionality of print queue service manager 85 for allocating the balance between network management device 20 and network management device 35 for supporting print queue services. As seen in FIG. 19, print queue service manager 85 is comprised of policy agent 152, load balancer 154 and data collector 155. Policy agent 152 obtains policy rules for allocation of print queue services from global policy agent 151 which is preferably accessed from a network management device which maintains a global services directory. Load balancer 154 detects external event 150, such as the addition of a new printer on the network, and consults policy agent 152 to determine if a reallocation of print queue services is necessary. This determination is also based on input to load balancer 154 from data collector 155 which collects statistics regarding the services performed in each of network management device 20 and network management device 35, such as from discovery modules 84 and 158, and print queue service modules 83 and 158.

Performance monitors 156 and 157 of network management device 20 and network management device 35, respectively, monitor performance of the aforementioned discovery modules and print queue service modules. The performance monitors are accessed and controlled by load balancer 154. In response to external event 150, the monitored performance of the network management device services, past service statistics, and policy agent 152, load balancer 154 determines whether to reallocate the print queue services between network management device 20 and network management device 35. If a reallocation is necessary, load balancer 154 instructs the discovery modules and print queue service modules of the network management devices accordingly.

Figure 20B:
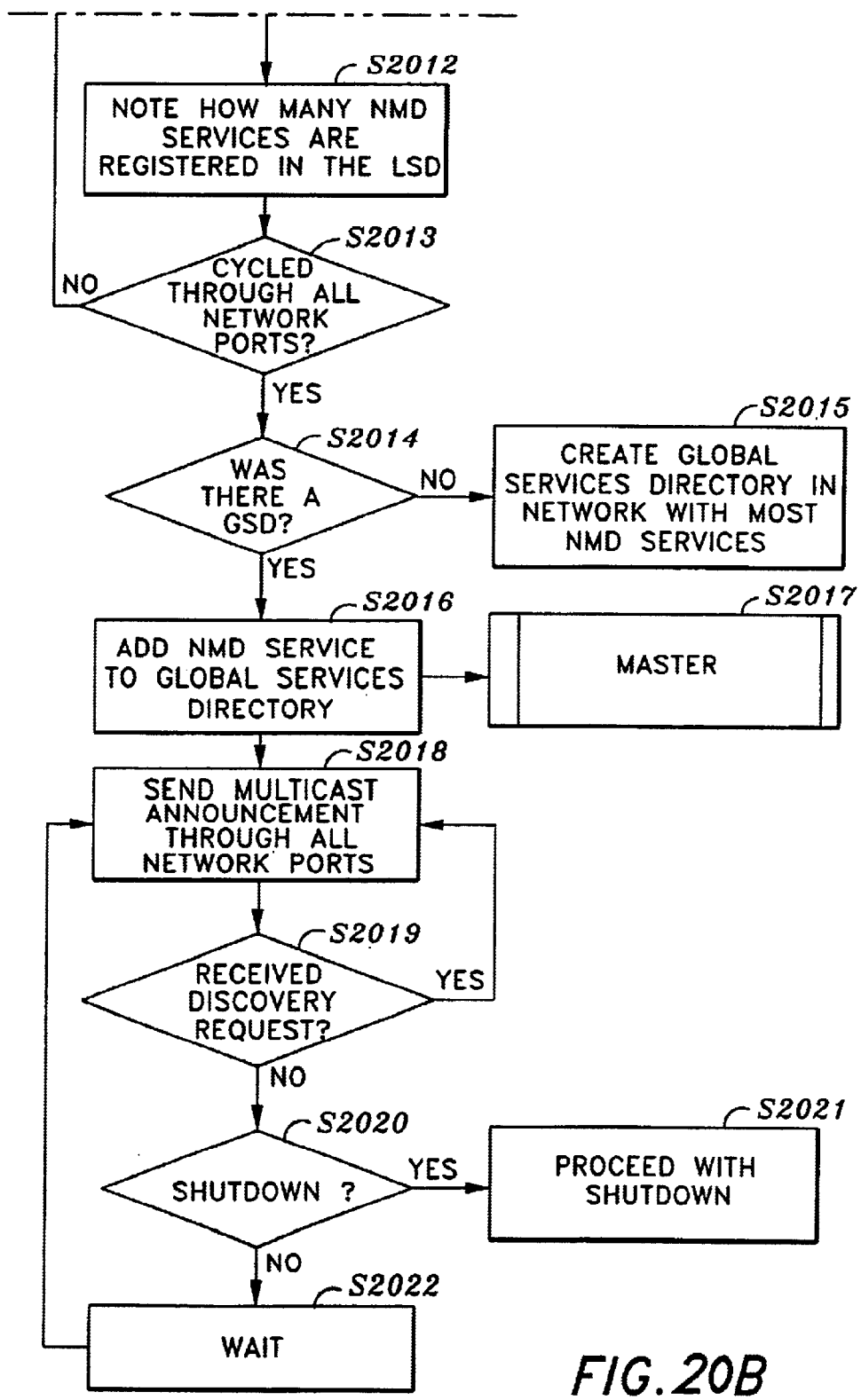
FIG. 20 is a flowchart for explaining an initialization process for a network management device according to one embodiment of the present invention.

FIG. 20 is a flowchart for explaining the initialization boot-up procedure for network management device 20 according to the present invention. In step S2001, the boot-up process begins at power-up of network management device 20 or in response to a user command. Next, flow passes to step S2002 in which a series of steps begin for each of the two network ports of network management device 20. In step S2003 it is determined whether the current network is enabled, such that network management device 20 is connected to a network segment (subnet) on that network port. If it is determined in step S2003 that the current network is not enabled flow returns to step S2002 for checking the next network port, if any others remain.

Otherwise, if the current network is enabled, flow passes to step S2004 in which a multicast announcement is sent by network management device 20 over the current network to discover other network management devices on the current network. Next, a multicast query for a global services directory is sent over the current network (step S2005). In step S2006, it is determined if a global services directory (GSD) was found, and if so, flow passes to step S2007 in which a GSD flag is set to "ON", after which flow passes to step S2008. If it was determined in step S2006 that a global services directory (GSD) was not found, flow passes directly to step S2008.

In step S2008, a multicast query is sent over the current network for a local services network. In step S2009, it is determined if a local services network was found. If not, flow passes to step S2010 in which a local services directory is created, and then flow passes to step S2011. If a local services directory was found in step S2009, flow passes directly to step S2011. In step S2011, the services supported by network management device 20 are added to the local services directory. Next, in step S2012, it is noted how many services are registered in the local services directory for network management device 20. In step S2013 it is determined whether all network ports of network management device 20 have been cycled through. If not, flow passes to step S2003 where the next network port is processed as in steps S2002 through S2012. If all network ports have been processed, flow passes to step S2014.

In step S2014, it is determined whether there was a global services directory found on any of the network ports by checking the GSD flag. If a global services directory was not found, a global services directory is created on whichever one of the two networks of network management device 20 has the most services (step S2015). It can be appreciated that other criteria can also be used to decide which subnet should have the global services directory. For example, the level of removal (number of subnet hops) from the other network management devices across the network can be a deciding factor. If a global services directory was found, the existence of network management device 20, as well as any global services performed by network management device 20, are entered into global services directory (step S2016). The processing for determining the master device is then initiated in parallel at step S2017. Accordingly, flow continues at step S2018 in which a multicast announcement is sent through all network ports of network management device 20. It is determined in step S2019 if a discovery request has been received, and, if so, flow returns to step S2018. If not, flow passes to step S2020 in which it is determined if network management device 20 should shutdown. If so, flow passes to step S2021 in which network management device 20 proceeds with shutdown. Otherwise, flow proceeds to step S2022 in which a wait state is engaged, after which flow returns to step S2018.

Figure 21:
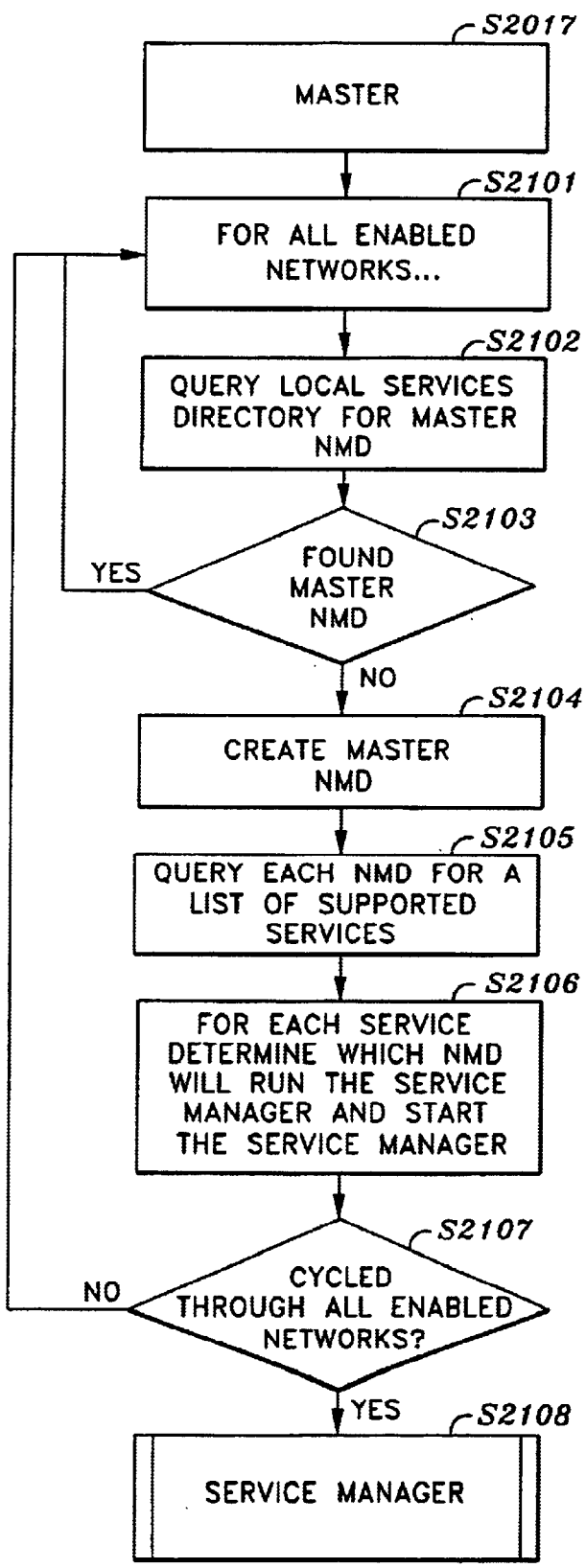
FIG. 21 is a flowchart for explaining the determination of a master network management device according to one embodiment of the present invention.

FIG. 21 provides a flowchart for explaining how a master device is determined according to the present invention, beginning at step S2017. In step S2101, processing starts for a specific one of the enabled networks of network management device 20. In step S2102, the local services directory is queried to determine the master network management device. In step S2103, it is determined if a master network management device was found and, if it has, flow returns to step S2101 to start processing for the other enabled network. If it is determined in step S2103 that a master network management device was not found, then flow passes to step S2104 in which a master network management device is created. Each network management device on the current network is then queried for a list of services supported by each network management device (step S2105).

For each service, it is determined which network management device will run the corresponding service manager and then start the service manager on that network management device (step S2106). In step S2107 it is determined if all enabled networks have been cycled through for network management device 20. If not, flow returns for a repeat of steps S2101 through S2107 for the next enabled network. If all enabled networks have been cycled through, flow passes to step S2108 in which processing for the service manager is started.

Figure 22:
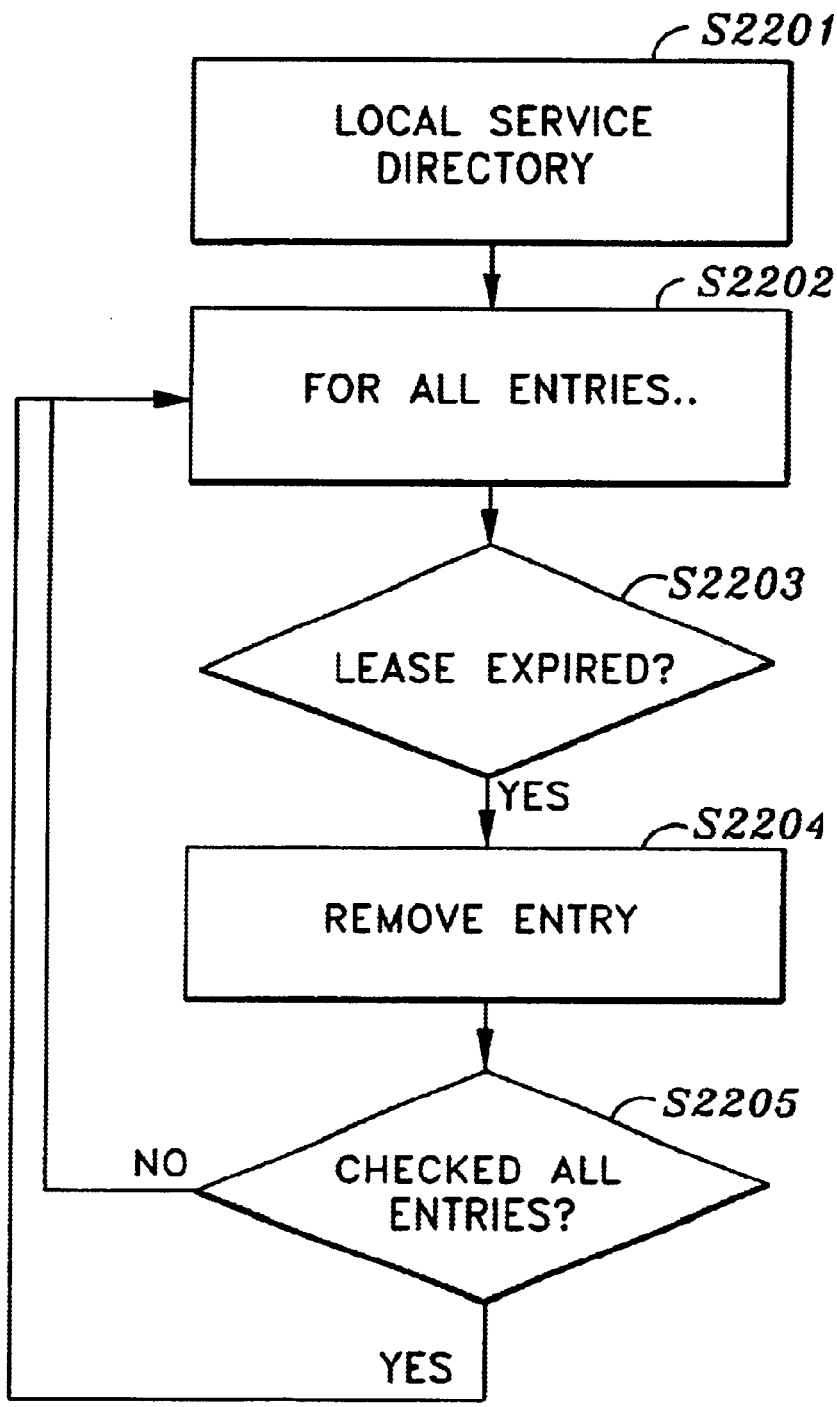
FIG. 22 is a flowchart for explaining the maintenance of a local service directory according to one embodiment of the present invention.

FIG. 22 is a flowchart for maintaining a local services directory. In step S2201 the processing for the local services directory begins. Processing for the next entry in the local services directory is started in step S2202. In step S2203 it is determined if the lease has expired for the entry in the local services directory and, if not, flow is returned to step S2202 for processing the next entry. If the lease has expired, flow passes to step S2204 in which the expired entry is removed from the local services directory. In step S2205, it is determined if all entries in the local services directory have been checked. If not, flow passes to step S2202 for checking the next entry. If all entries have been checked, flow passes to step S2202 to start checking the entries again after a predetermined time.

Figure 23B:
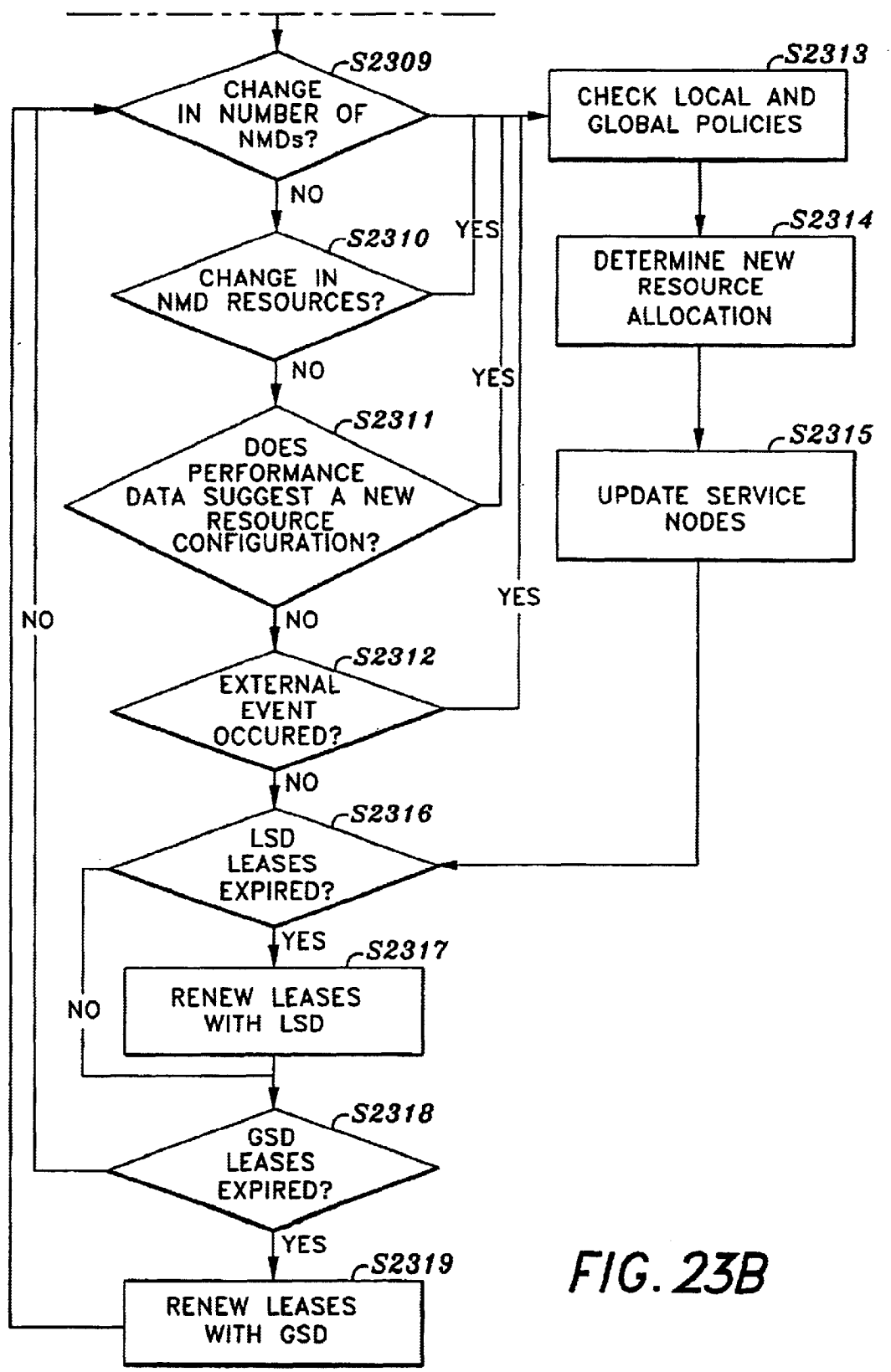
FIG. 23 is a flowchart for explaining the functionality of a service manager according to one embodiment of the present invention.

FIG. 23 is a flowchart for explaining the operation of service management beginning with processing at step S2108. In step S2301, a wait is endured for direction from the master network management device or from the service manager. In step S2302 it is determined if the network management device is a service manager, and if not, service operation is conducted in step S2303. Otherwise, flow passes to step S2304 in which the service manager is started. In step S2305, the service functionality is published to the local services directory. Similarly, global functionality is published to the global services directory in step S2306. The service manager load balancer allocates resources among network management devices in step S2307. Service manager operation is commenced at step S2308.

In step S2309, it is determined if there has been a change in the number of discovered network management devices and, if so, flow passes to step S2313. If not flow passes to step S2310. In step S2310, it is determined if there has been a change in the network management resources and, if so, flow passes to step S2313. If not flow passes to step S2311. In step S2311, it is determined if the performance data suggests a new resource configuration and, if so, flow passes to step S2313. If not flow passes to step S2312. In step S2312, it is determined if an external event has occurred and, if so, flow passes to step S2313. If not flow passes to step S2316.

In step S2313, the local and global policies are checked for allocation of resources for the service manager. Next, a new resource allocation is determined in accordance with the local and global policies (step S2314). The service nodes in the network management devices are updated according to the new resource allocation in step S2315. Flow then passes to step S2316 in which it is determined if the local services directory leases have expired for the service nodes. If the leases have expired, flow passes to step S2317 in which the leases are renewed with the local services directory and then flow passes to step S2318. If the leases have not expired, flow passes directly to step S2318 in which it is determined if the global services directory leases for the service nodes have expired. If the global services directory leases have not expired, flow returns to step S2309. If the global services directory leases have expired, the leases are renewed in step S2319 and then flow returns to step S2309 upon which the service manager operation is repeated.

Figure 24:
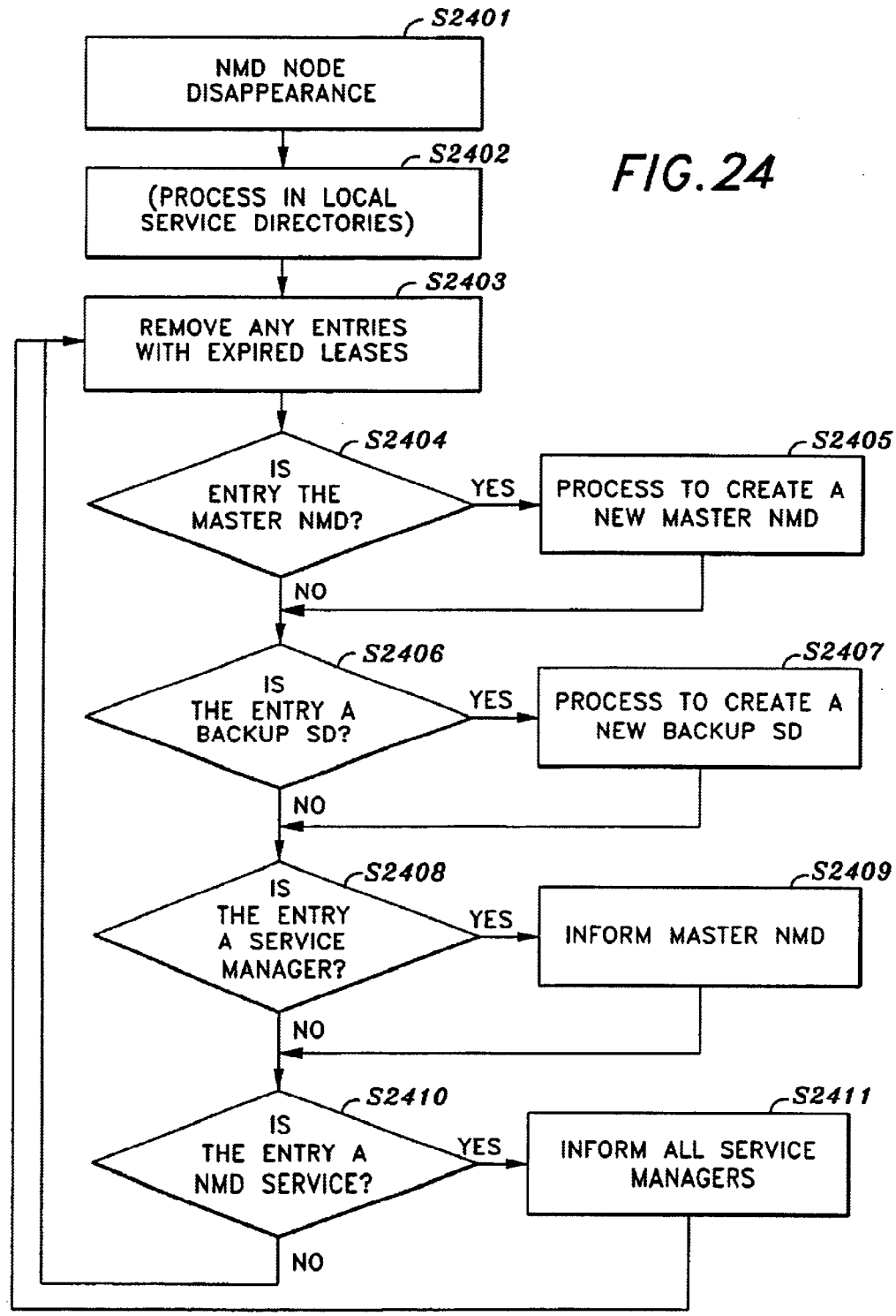
FIG. 24 is a flowchart for explaining a fault mode process according to one embodiment of the present invention.

FIG. 24 is a flowchart for explaining fault mode operation in the event of failure of a network management device. In step S2401, the fault mode processing is started. The processing is then carried out in each local service directory (step S2402). In step S2403 any entry in the local service directory with an expired lease is removed. In step S2404, it is determined if the entry for the failed network management device corresponds to the master network management device. If so, a new master network management device is created (step S2405) and then flow passes to step S2406. If not, flow passes to step S2406 in which it is determined if the entry for the failed network management device corresponds to a backup services directory, and if so, a new backup services directory is created (step S2407) and flow passes to step S2408. If not, flow passes to step S2408 in which it is determined if the entry for the failed network management device corresponds to a service manager and, if so, the master network management device is informed in step S2409 after which flow passes to step S2410. If not, flow passes directly to step S2410. In step S2410, it is determined if the entry for the failed network management device corresponds to a network management device service and, if so, all service managers are informed in step S2411, after which flow passes to step S2403 to repeat the fault management process. If the entry for the failed network management device does not correspond to a network management device service, flow passes directly to step S2403.

Figure 25:
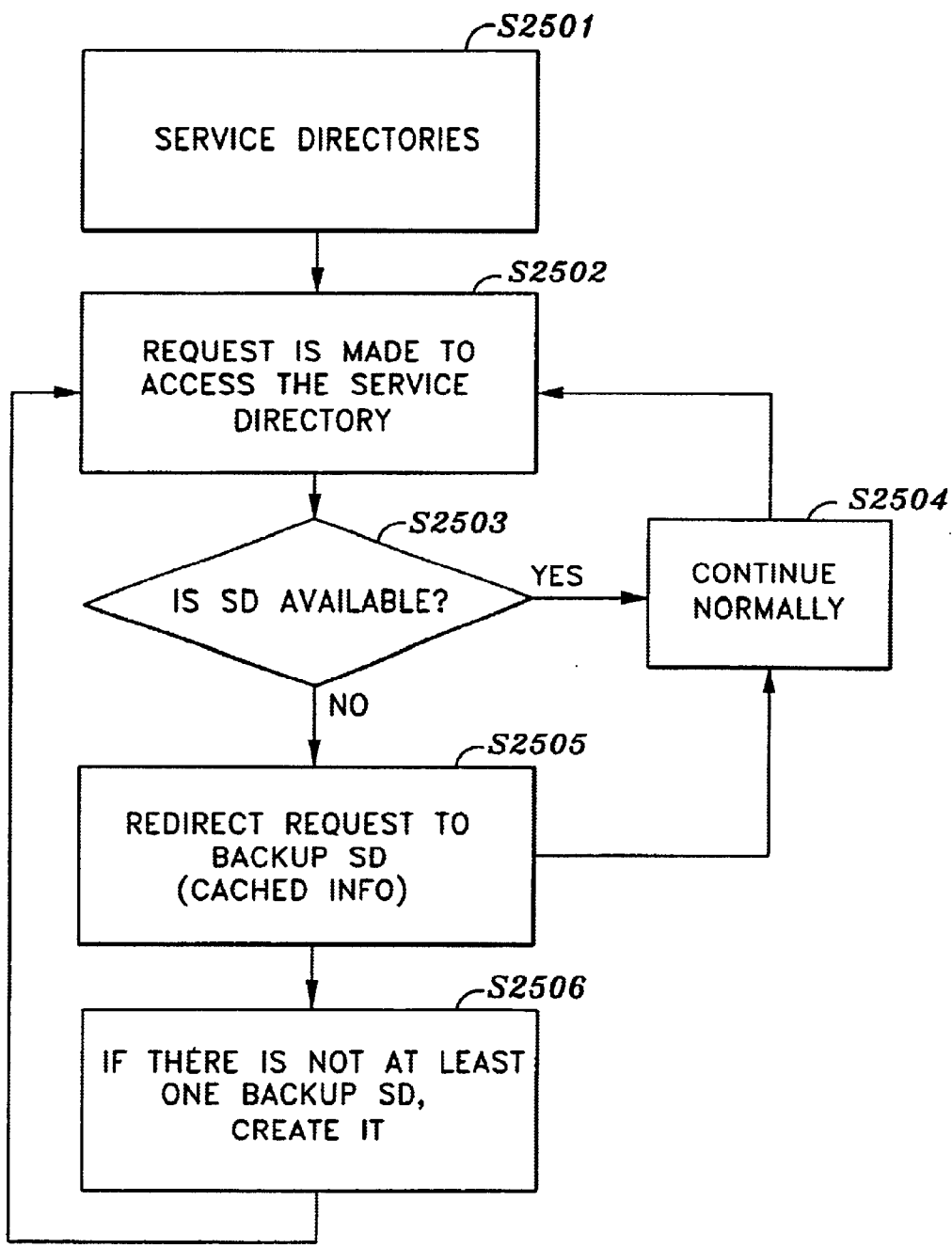
FIG. 25 is a flowchart for explaining a fault mode process according to one embodiment of the present invention.

FIG. 25 is a flowchart for explaining a fault management process for failure of a service directory beginning at step S2501. In step S2502, a request is made to access a particular service directory. In step S2503 it is determined if the service directory is available, and if it is, flow passes through step S2504 to continue with normal operations and flow is passed to step S2502 to repeat the fault management process. If it is determined in step S2503 that the services directory is not available, flow passes to step S2505 in which the request for the services directory is redirected to the corresponding backup services directory. If the request is passed successfully to the backup services directory, flow passes through step S2504 to step S2502 to repeat the fault management process. If a backup services directory does not exist, flow passes to step S2506 in which a backup services directory is created. Flow then passes to step S2502 in which the fault management process is repeated.

Based on the above discussion and accompanying figures, it can be appreciated that the present invention provides for efficient management of a large number of network devices, such as network printers, across a network so that the initialization and network configuration of network devices across the network is automatically managed, and so that the network devices can be physically isolated from a main network to reduce undesirable network traffic from the main network and to prevent network users from unauthorized access and use of the network devices. The present invention also provides a single, focused user interface for a network administrator to manage all network devices across the network.

The invention has been described with particular illustrative embodiments. It is to be understood that the invention is not limited to the above-described embodiments and that various changes and modifications may be made by those of ordinary skill in the art without departing from the spirit and scope of the invention. In particular, and as stated above, the invention can be used to manage various types of network devices, not just network printers.

What is claimed is:

1. A method for use in a network management device for managing a plurality of network devices on a network, said method comprising the steps of:
   detecting an address assignment message sent from an address server over the network to one of the plurality of network devices, the address assignment message containing an assigned address corresponding to the network device;
   sending, in response to the detection of the address assignment message, an information request message over the network from the network management device to the network device, the information request message containing the assigned address corresponding to the network device;
   receiving, in response to the information request message, information from the network device; and
   creating an entry corresponding to the network device in a device management directory, the entry containing the assigned address corresponding to the network device and the information received from the network device.

2. A method according to claim 1, wherein the plurality of network devices are network printers.

3. A method according to claim 1, wherein the address assignment message is a DHCP message, the address server is a DHCP server and the assigned address is an IP address.

4. A method according to claim 3, wherein the DHCP server is disposed in the network management device and provides the detection of the address assignment message.

5. A method according to claim 1, wherein the address assignment message is detected by a listening module disposed in the network management device.

6. A method according to claim 1, wherein the address assignment message further contains a preset identification address corresponding to the printing device.

7. A method according to claim 6, wherein in the sending step, the information request message is only sent if the preset identification address of the address assignment message is within a predetermined range of identification addresses.

8. A method according to claim 6, wherein the preset identification address is a MAC address and, in the detecting step, the address assignment message is only detected if the MAC address is within a predetermined range of MAC addresses.

9. A method according to claim 2, further comprising the step of initiating execution of a virtual device module corresponding to the printing device, the virtual device module for extending the functional capabilities of the printing device.

10. A method according to claim 9, further comprising the step of initiating execution of a functional application module for interfacing with the virtual device module for utilizing an extended functional capability of the network device.

11. A method according to claim 10, wherein the functional application module is a print job accounting application module.

12. A method according to claim 10, wherein the functional application module is a print job policy management application module.

13. A method according to claim 10, wherein the functional application module is a printing device management application module.

14. A method according to claim 10, wherein the functional application module is a printing device driver utility.

15. A method according to claim 10, wherein the functional application module is a secure print job application module.

16. A method according to claim 1, further comprising the step of publishing the presence of the network management device to a plurality of workstations on the network.

17. A method according to claim 16, wherein the network management device is published as a print server for each network device having an entry in the device management directory.

18. A method according to claim 2, further comprising the steps of creating a print queue for each printing device having an entry in the device management directory and publishing each respective print queue to a plurality of workstations on the network.

19. A method according to claim 18, further comprising the steps of receiving a print job from one of the workstations, the print job being directed to one of the print queues, submitting the print job to the corresponding print queue, and sending the print job from the print queue to the printing device corresponding to the print queue.

20. A method according to claim 1, wherein the network management device includes a web server which provides a network configuration web page for access by at least one workstation having a connection with the network management device, the network configuration web page containing a user interface for management of the network management device and of each network device having an entry in the device management directory.

21. A method according to claim 1, wherein the network management device includes a user interface panel for management of the network management device and of each network device having an entry in the device management directory.

22. A method according to claim 13, wherein the printing device management application module supports a user interface display on a workstation having a connection with the network management device, the user interface for management of the network management device and of each printing device having an entry in the device management directory.

23. A method according to claim 1, wherein the network is a local network, wherein the network management device has a first interface card which connects the network management device to the plurality of network devices via the local network, and has a second interface card which connects the network management device to a main network.

24. A method according to claim 23, wherein at least one network server and at least one network computing device are connected to the main network, and wherein the network server and the network computing device can communicate with the plurality of network devices only through the network management device.

25. A method according to claim 23, wherein the address assignment message is a DHCP message, the address server is a DHCP server provided in the network management device, and the assigned address is a local IP address for use on the local network only.

26. A method according to claim 23, wherein the plurality of network devices are network printers, and further comprising the steps of creating a print queue for each printing device having an entry in the device management directory and publishing each respective print queue to a plurality of workstations on the main network.

27. A method according to claim 26, further comprising the steps of receiving a print job over the main network from one of the workstations, the print job being directed to an identified one of the print queues, submitting the print job to the identified print queue, and sending the print job from the identified print queue over the local network to the printing device associated with the identified print queue.

28. A method according to claim 23, wherein a second network management device having first and second interface cards is connected to the plurality of network devices on the local network via the first interface card, and is connected to the main network via the second interface card.

29. A method according to claim 23, wherein at least one additional network management device having first and second interface cards is connected to a second plurality of network devices on a second local network via the first interface card, and is connected to the main network via the second interface card.

30. A method according to claim 29, wherein each network management device sends an announcement message over the main network for detection by the other network management device, whereby each network management device detects the presence of the other network management device.

31. A method according to claim 30, wherein one of the network management devices is designated as a master network management device and the at least one other network management device is designated as a slave network management device.

32. A method according to claim 31, wherein the master network management device obtains a copy of the device management directory from the slave network management device.

33. A method according to claim 32, wherein only the master network management device supports a user interface for management of the master network management device, the slave network management device and all network devices having entries in the respective device management directories of each network management device.

34. A method according to claim 32, wherein each network management device on the network supports a user interface for obtaining information and managing the particular network management device and all network devices having entries in the respective device management directories of all network management devices.

35. A method according to claim 32, wherein the master network management device creates a combined device management directory containing entries from the device management directory of the master network management device and from the device management directory of the slave network management device.

36. A method according to claim 35, wherein the master network management device sends a backup copy of the combined device management directory to the slave network management device.

37. A method according to claim 36, wherein, in the case of failure of the master network management device, the slave network management device is re-designated as the master network management device.

38. A method according to claim 28, wherein the network management device creates and maintains a plurality of print queues corresponding to a determined subset of the plurality of printing devices, and wherein the second network management device creates and maintains a plurality of print queues corresponding to the remaining ones of the plurality of printing devices.

39. A method according to claim 38, wherein the determined subset is determined based on a resource availability indicator for each of the network management devices.

40. A method according to claim 28, wherein the network management device instructs the second network management device via the main network to disable a capability of the second network management device to send and detect address assignment messages.

41. A method according to claim 23, wherein a plurality of network management devices are connected to the main network via a first interface card in each respective network management device, and wherein each respective network management device is connected to a separate plurality of network devices on a separate local network via a second interface card.

42. A method according to claim 41, wherein a designated one of the plurality of network management devices collects information from each of the other network management devices regarding a set of functional services that each network management device supports for each of the separate plurality of network devices connected to the respective network management device.

43. A method according to claim 42, wherein the designated network management device generates a global functional services directory based on the collected information.

44. A method according to claim 31, wherein the master network management device collects information from the slave network management device regarding a set of functional services that the slave network management device supports for each of the plurality of network devices.

45. A method according to claim 44, wherein the master network management device generates a local functional services directory based on the collected information from the slave network management device and based on information regarding a set of functional services that the master network management device supports for each of the plurality of network devices.

46. A method for use in a network management device for managing a plurality of network printers on a network, said method comprising the steps of:

receiving an address request message from one of the plurality of network printers, the address request message containing a MAC address corresponding to the network printer;

sending an address assignment message from an address server in the network management device over the network to the network printer, the address assignment message containing the MAC address and an assigned IP address corresponding to the network printer;

notifying a discovery module in the network management device of the assigned IP address of the network printer;

determining, in the discovery module, if the MAC address of the network printer is within a predetermined range of MAC addresses;

sending, in the case that the MAC address of the network printer is within the predetermined range of MAC addresses, an information request message from the discovery module over the network to the network printer, the information request message containing the assigned IP address corresponding to the network printer;

receiving, in the case that the MAC address of the network printer is within the predetermined range of MAC addresses, information from the network printer in response to the information request message; and creating, in the case that the MAC address of the network printer is within the predetermined range of MAC addresses, an entry corresponding to the network printer in a device management directory, the entry containing the MAC address and the assigned IP address corresponding to the network printer, and containing the information received from the network printer.

47. A network management device for managing a plurality of network devices on a network, said computing device comprising:

a program memory for storing process steps executable to perform the steps of (a) detecting an address assignment message sent from an address server over the network to one of the plurality of network devices, the address assignment message containing an assigned address corresponding to the network device, (b) sending, in response to the detection of the address assignment message, an information request message over the network from the network management device to the network device, the information request message containing the assigned address corresponding to the network device, (c) receiving, in response to the information request message, information from the network device, and (d) creating an entry corresponding to the network device in a device management directory, the entry containing the assigned address corresponding to the network device and the information received from the network device; and a processor for executing the process steps stored in said program memory.

48. A network management device according to claim 47, wherein the plurality of network devices are network printers.

49. A network management device according to claim 47, wherein the address assignment message is a DHCP message, the address server is a DHCP server and the assigned address is an IP address.

50. A network management device according to claim 49, wherein the DHCP server is disposed in the network management device and provides the detection of the address assignment message.

51. A network management device according to claim 47, wherein the address assignment message is detected by a listening module disposed in the network management device.

52. A network management device according to claim 47, wherein the address assignment message further contains a preset identification address corresponding to the printing device.

53. A network management device according to claim 52, wherein in the sending step, the information request message is only sent if the preset identification address of the address assignment message is within a predetermined range of identification addresses.

54. A network management device according to claim 52, wherein the preset identification address is a MAC address and, in the detecting step, the address assignment message is only detected if the MAC address is within a predetermined range of MAC addresses.

55. A network management device according to claim 48, further comprising the step of initiating execution of a virtual device module corresponding to the printing device, the virtual device module for extending the functional capabilities of the printing device.

56. A network management device according to claim 55, further comprising the step of initiating execution of a functional application module for interfacing with the virtual device module for utilizing an extended functional capability of the network device.

57. A network management device according to claim 56, wherein the functional application module is a print job accounting application module.

58. A network management device according to claim 56, wherein the functional application module is a print job policy management application module.

59. A network management device according to claim 56, wherein the functional application module is a printing device management application module.

60. A network management device according to claim 56, wherein the functional application module is a printing device driver utility.

61. A network management device according to claim 56, wherein the functional application module is a secure print job application module.

62. A network management device according to claim 47, further comprising the step of publishing the presence of the network management device to a plurality of workstations on the network.

63. A network management device according to claim 62, wherein the network management device is published as a print server for each network device having an entry in the device management directory.

64. A network management device according to claim 48, further comprising the steps of creating a print queue for each printing device having an entry in the device management directory and publishing each respective print queue to a plurality of workstations on the network.

65. A network management device according to claim 64, further comprising the steps of receiving a print job from one of the workstations, the print job being directed to one of the print queues, submitting the print job to the corresponding print queue, and sending the print job from the print queue to the printing device corresponding to the print queue.

66. A network management device according to claim 47, wherein the network management device includes a web server which provides a network configuration web page for access by at least one workstation having a connection with the network management device, the network configuration web page containing a user interface for management of the network management device and of each network device having an entry in the device management directory.

67. A network management device according to claim 47, wherein the network management device includes a user interface panel for management of the network management device and of each network device having an entry in the device management directory.

68. A network management device according to claim 59, wherein the printing device management application module supports a user interface display on a workstation having a connection with the network management device, the user interface for management of the network management device and of each printing device having an entry in the device management directory.

69. A network management device according to claim 47, wherein the network is a local network, wherein the network management device has a first interface card which connects the network management device to the plurality of network devices via the local network, and has a second interface card which connects the network management device to a main network.

70. A network management device according to claim 69, wherein at least one network server and at least one network computing device are connected to the main network, and wherein the network server and the network computing device can communicate with the plurality of network devices only through the network management device.

71. A network management device according to claim 69, wherein the address assignment message is a DHCP message, the address server is a DHCP server provided in the network management device, and the assigned address is a local IP address for use on the local network only.

72. A network management device according to claim 69, wherein the plurality of network devices are network printers, and further comprising the steps of creating a print queue for each printing device having an entry in the device management directory and publishing each respective print queue to a plurality of workstations on the main network.

73. A network management device according to claim 72, further comprising the steps of receiving a print job over the main network from one of the workstations, the print job being directed to an identified one of the print queues, submitting the print job to the identified print queue, and sending the print job from the identified print queue over the local network to the printing device associated with the identified print queue.

74. A network management device according to claim 69, wherein a second network management device having first and second interface cards is connected to the plurality of network devices on the local network via the first interface card, and is connected to the main network via the second interface card.

75. A network management device according to claim 69, wherein at least one additional network management device having first and second interface cards is connected to a second plurality of network devices on a second local network via the first interface card, and is connected to the main network via the second interface card.

76. A network management device according to claim 75, wherein each network management device sends an announcement message over the main network for detection by the other network management device, whereby each network management device detects the presence of the other network management device.

77. A network management device according to claim 76, wherein one of the network management devices is designated as a master network management device and the at least one other network management device is designated as a slave network management device.

78. A network management device according to claim 77, wherein the master network management device obtains a copy of the device management directory from the slave network management device.

79. A network management device according to claim 78, wherein only the master network management device supports a user interface for management of the master network management device, the slave network management device and all network devices having entries in the respective device management directories of each network management device.

80. A network management device according to claim 78, wherein each network management device on the network supports a user interface for obtaining information and managing the particular network management device and all network devices having entries in the respective device management directories of all network management devices.

81. A network management device according to claim 78, wherein the master network management device creates a combined device management directory containing entries from the device management directory of the master network management device and from the device management directory of the slave network management device.

82. A network management device according to claim 81, wherein the master network management device sends a backup copy of the combined device management directory to the slave network management device.

83. A network management device according to claim 82, wherein, in the case of failure of the master network management device, the slave network management device is re-designated as the master network management device.

84. A network management device according to claim 74, wherein the network management device creates and maintains a plurality of print queues corresponding to a determined subset of the plurality of printing devices, and wherein the second network management device creates and maintains a plurality of print queues corresponding to the remaining ones of the plurality of printing devices.

85. A network management device according to claim 84, wherein the determined subset is determined based on a resource availability indicator for each of the network management devices.

86. A network management device according to claim 74, wherein the network management device instructs the second network management device via the main network to disable a capability of the second network management device to send and detect address assignment messages.

87. A network management device according to claim 69, wherein a plurality of network management devices are connected to the main network via a first interface card in each respective network management device, and wherein each respective network management device is connected to a separate plurality of network devices on a separate local network via a second interface card.

88. A network management device according to claim 87, wherein a designated one of the plurality of network management devices collects information from each of the other network management devices regarding a set of functional services that each network management device supports for each of the separate plurality of network devices connected to the respective network management device.

89. A network management device according to claim 88, wherein the designated network management device generates a global functional services directory based on the collected information.

90. A network management device according to claim 77, wherein the master network management device collects information from the slave network management device regarding a set of functional services that the slave network management device supports for each of the plurality of network devices.

91. A network management device according to claim 90, wherein the master network management device generates a local functional services directory based on the collected information from the slave network management device and based on information regarding a set of functional services that the master network management device supports for each of the plurality of network devices.

92. Computer-executable process steps stored on a computer readable medium, said computer-executable process steps for managing a plurality of network devices on a network by a network management device, said computer-executable process steps comprising the steps of:

a detection step of detecting an address assignment message sent from an address server over the network to one of the plurality of network devices, the address assignment message containing an assigned address corresponding to the network device;

a sending step of sending, in response to the detection of the address assignment message, an information request message over the network from the network management device to the network device, the information request message containing the assigned address corresponding to the network device;

a receiving step of receiving, in response to the information request message, information from the network device; and a creating step of creating an entry corresponding to the network device in a device management directory, the entry containing the assigned address corresponding to the network device and the information received from the network device.

93. Computer-executable process steps according to claim 92, wherein the plurality of network devices are network printers.

94. Computer-executable process steps according to claim 92, wherein the address assignment message is a DHCP message, the address server is a DHCP server and the assigned address is an IP address.

95. Computer-executable process steps according to claim 94, wherein the DHCP server is disposed in the network management device and provides the detection of the address assignment message.

96. Computer-executable process steps according to claim 92, wherein the address assignment message is detected by a listening module disposed in the network management device.

97. Computer-executable process steps according to claim 92, wherein the address assignment message further contains a preset identification address corresponding to the printing device.

98. Computer-executable process steps according to claim 97, wherein in the sending step, the information request message is only sent if the preset identification address of the address assignment message is within a predetermined range of identification addresses.

99. Computer-executable process steps according to claim 97, wherein the preset identification address is a MAC address and, in the detecting step, the address assignment message is only detected if the MAC address is within a predetermined range of MAC addresses.

100. Computer-executable process steps according to claim 93, further comprising the step of initiating execution of a virtual device module corresponding to the printing device, the virtual device module for extending the functional capabilities of the printing device.

101. Computer-executable process steps according to claim 100, further comprising the step of initiating execution of a functional application module for interfacing with the virtual device module for utilizing an extended functional capability of the network device.

102. Computer-executable process steps according to claim 101, wherein the functional application module is a print job accounting application module.

103. Computer-executable process steps according to claim 101, wherein the functional application module is a print job policy management application module.

104. Computer-executable process steps according to claim 101, wherein the functional application module is a printing device management application module.

105. Computer-executable process steps according to claim 101, wherein the functional application module is a printing device driver utility.

106. Computer-executable process steps according to claim 101, wherein the functional application module is a secure print job application module.

107. Computer-executable process steps according to claim 92, further comprising the step of publishing the presence of the network management device to a plurality of workstations on the network.

108. Computer-executable process steps according to claim 107, wherein the network management device is published as a print server for each network device having an entry in the device management directory.

109. Computer-executable process steps according to claim 93, further comprising the steps of creating a print queue for each printing device having an entry in the device management directory and publishing each respective print queue to a plurality of workstations on the network.

110. Computer-executable process steps according to claim 109, further comprising the steps of receiving a print job from one of the workstations, the print job being directed to one of the print queues, submitting the print job to the corresponding print queue, and sending the print job from the print queue to the printing device corresponding to the print queue.

111. Computer-executable process steps according to claim 92, wherein the network management device includes a web server which provides a network configuration web page for access by at least one workstation having a connection with the network management device, the network configuration web page containing a user interface for management of the network management device and of each network device having an entry in the device management directory.

112. Computer-executable process steps according to claim 92, wherein the network management device includes a user interface panel for management of the network management device and of each network device having an entry in the device management directory.

113. Computer-executable process steps according to claim 104, wherein the printing device management application module supports a user interface display on a workstation having a connection with the network management device, the user interface for management of the network management device and of each printing device having an entry in the device management directory.

114. Computer-executable process steps according to claim 92, wherein the network is a local network, wherein the network management device has a first interface card which connects the network management device to the plurality of network devices via the local network, and has a second interface card which connects the network management device to a main network.

115. Computer-executable process steps according to claim 114, wherein at least one network server and at least one network computing device are connected to the main network, and wherein the network server and the network computing device can communicate with the plurality of network devices only through the network management device.

116. Computer-executable process steps according to claim 114, wherein the address assignment message is a DHCP message, the address server is a DHCP server provided in the network management device, and the assigned address is a local IP address for use on the local network only.

117. Computer-executable process steps according to claim 114, wherein the plurality of network devices are network printers, and further comprising the steps of creating a print queue for each printing device having an entry in the device management directory and publishing each respective print queue to a plurality of workstations on the main network.

118. Computer-executable process steps according to claim 117, further comprising the steps of receiving a print job over the main network from one of the workstations, the print job being directed to an identified one of the print queues, submitting the print job to the identified print queue, and sending the print job from the identified print queue over the local network to the printing device associated with the identified print queue.

119. Computer-executable process steps according to claim 114, wherein a second network management device having first and second interface cards is connected to the plurality of network devices on the local network via the first interface card, and is connected to the main network via the second interface card.

120. Computer-executable process steps according to claim 114, wherein at least one additional network management device having first and second interface cards is connected to a second plurality of network devices on a second local network via the first interface card, and is connected to the main network via the second interface card.

121. Computer-executable process steps according to claim 120, wherein each network management device sends an announcement message over the main network for detection by the other network management device, whereby each network management device detects the presence of the other network management device.

122. Computer-executable process steps according to claim 121, wherein one of the network management devices is designated as a master network management device and the at least one other network management device is designated as a slave network management device.

123. Computer-executable process steps according to claim 122, wherein the master network management device obtains a copy of the device management directory from the slave network management device.

124. Computer-executable process steps according to claim 123, wherein only the master network management device supports a user interface for management of the master network management device, the slave network management device and all network devices having entries in the respective device management directories of each network management device.

125. Computer-executable process steps according to claim 123, wherein each network management device on the network supports a user interface for obtaining information and managing the particular network management device and all network devices having entries in the respective device management directories of all network management devices.

126. Computer-executable process steps according to claim 123, wherein the master network management device creates a combined device management directory containing entries from the device management directory of the master network management device and from the device management directory of the slave network management device.

127. Computer-executable process steps according to claim 126, wherein the master network management device sends a backup copy of the combined device management directory to the slave network management device.

128. Computer-executable process steps according to claim 127, wherein, in the case of failure of the master network management device, the slave network management device is re-designated as the master network management device.

129. Computer-executable process steps according to claim 119, wherein the network management device creates and maintains a plurality of print queues corresponding to a determined subset of the plurality of printing devices, and wherein the second network management device creates and maintains a plurality of print queues corresponding to the remaining ones of the plurality of printing devices.

130. Computer-executable process steps according to claim 129, wherein the determined subset is determined based on a resource availability indicator for each of the network management devices.

131. Computer-executable process steps according to claim 119, wherein the network management device instructs the second network management device via the main network to disable a capability of the second network management device to send and detect address assignment messages.

132. Computer-executable process steps according to claim 114, wherein a plurality of network management devices are connected to the main network via a first interface card in each respective network management device, and wherein each respective network management device is connected to a separate plurality of network devices on a separate local network via a second interface card.

133. Computer-executable process steps according to claim 132, wherein a designated one of the plurality of network management devices collects information from each of the other network management devices regarding a set of functional services that each network management device supports for each of the separate plurality of network devices connected to the respective network management device.

134. Computer-executable process steps according to claim 133, wherein the designated network management device generates a global functional services directory based on the collected information.

135. Computer-executable process steps according to claim 122, wherein the master network management device collects information from the slave network management device regarding a set of functional services that the slave network management device supports for each of the plurality of network devices.

136. Computer-executable process steps according to claim 135, wherein the master network management device generates a local functional services directory based on the collected information from the slave network management device and based on information regarding a set of functional services that the master network management device supports for each of the plurality of network devices.

137. A computer-readable medium which stores computer-executable process steps, the computer-executable process steps to manage a plurality of network devices on a network by a network management device, said computer-executable process steps comprising:

a detection step of detecting an address assignment message sent from an address server over the network to one of the plurality of network devices, the address assignment message containing an assigned address corresponding to the network device;

a sending step of sending, in response to the detection of the address assignment message, an information request message over the network from the network management device to the network device, the information request message containing the assigned address corresponding to the network device;

a receiving step of receiving, in response to the information request message, information from the network device; and a creating step of creating an entry corresponding to the network device in a device management directory, the entry containing the assigned address corresponding to the network device and the information received from the network device.

138. A computer-readable medium according to claim 137, wherein the plurality of network devices are network printers.

139. A computer-readable medium according to claim 137, wherein the address assignment message is a DHCP message, the address server is a DHCP server and the assigned address is an IP address.

140. A computer-readable medium according to claim 139, wherein the DHCP server is disposed in the network management device and provides the detection of the address assignment message.

141. A computer-readable medium according to claim 137, wherein the address assignment message is detected by a listening module disposed in the network management device.

142. A computer-readable medium according to claim 137, wherein the address assignment message further contains a preset identification address corresponding to the printing device.

143. A computer-readable medium according to claim 142, wherein in the sending step, the information request message is only sent if the preset identification address of the address assignment message is within a predetermined range of identification addresses.

144. A computer-readable medium according to claim 142, wherein the preset identification address is a MAC address and, in the detecting step, the address assignment message is only detected if the MAC address is within a predetermined range of MAC addresses.

145. A computer-readable medium according to claim 138, further comprising the step of initiating execution of a virtual device module corresponding to the printing device, the virtual device module for extending the functional capabilities of the printing device.

146. A computer-readable medium according to claim 145, further comprising the step of initiating execution of a functional application module for interfacing with the virtual device module for utilizing an extended functional capability of the network device.

147. A computer-readable medium according to claim 146, wherein the functional application module is a print job accounting application module.

148. A computer-readable medium according to claim 146, wherein the functional application module is a print job policy management application module.

149. A computer-readable medium according to claim 146, wherein the functional application module is a printing device management application module.

150. A computer-readable medium according to claim 146, wherein the functional application module is a printing device driver utility.

151. A computer-readable medium according to claim 146, wherein the functional application module is a secure print job application module.

152. A computer-readable medium according to claim 137, further comprising the step of publishing the presence of the network management device to a plurality of workstations on the network.

153. A computer-readable medium according to claim 152, wherein the network management device is published as a print server for each network device having an entry in the device management directory.

154. A computer-readable medium according to claim 138, further comprising the steps of creating a print queue for each printing device having an entry in the device management directory and publishing each respective print queue to a plurality of workstations on the network.

155. A computer-readable medium according to claim 154, further comprising the steps of receiving a print job from one of the workstations, the print job being directed to one of the print queues, submitting the print job to the corresponding print queue, and sending the print job from the print queue to the printing device corresponding to the print queue.

156. A computer-readable medium according to claim 137, wherein the network management device includes a web server which provides a network configuration web page for access by at least one workstation having a connection with the network management device, the network configuration web page containing a user interface for management of the network management device and of each network device having an entry in the device management directory.

157. A computer-readable medium according to claim 137, wherein the network management device includes a user interface panel for management of the network management device and of each network device having an entry in the device management directory.

158. A computer-readable medium according to claim 149, wherein the printing device management application module supports a user interface display on a workstation having a connection with the network management device, the user interface for management of the network management device and of each printing device having an entry in the device management directory.

159. A computer-readable medium according to claim 137, wherein the network is a local network, wherein the network management device has a first interface card which connects the network management device to the plurality of network devices via the local network, and has a second interface card which connects the network management device to a main network.

160. A computer-readable medium according to claim 159, wherein at least one network server and at least one network computing device are connected to the main network, and wherein the network server and the network computing device can communicate with the plurality of network devices only through the network management device.

161. A computer-readable medium according to claim 159, wherein the address assignment message is a DHCP message, the address server is a DHCP server provided in the network management device, and the assigned address is a local IP address for use on the local network only.

162. A computer-readable medium according to claim 159, wherein the plurality of network devices are network printers, and further comprising the steps of creating a print queue for each printing device having an entry in the device management directory and publishing each respective print queue to a plurality of workstations on the main network.

163. A computer-readable medium according to claim 162, further comprising the steps of receiving a print job over the main network from one of the workstations, the print job being directed to an identified one of the print queues, submitting the print job to the identified print queue, and sending the print job from the identified print queue over the local network to the printing device associated with the identified print queue.

164. A computer-readable medium according to claim 159, wherein a second network management device having first and second interface cards is connected to the plurality of network devices on the local network via the first interface card, and is connected to the main network via the second interface card.

165. A computer-readable medium according to claim 159, wherein at least one additional network management device having first and second interface cards is connected to a second plurality of network devices on a second local network via the first interface card, and is connected to the main network via the second interface card.

166. A computer-readable medium according to claim 165, wherein each network management device sends an announcement message over the main network for detection by the other network management device, whereby each network management device detects the presence of the other network management device.

167. A computer-readable medium according to claim 166, wherein one of the network management devices is designated as a master network management device and the at least one other network management device is designated as a slave network management device.

168. A computer-readable medium according to claim 167, wherein the master network management device obtains a copy of the device management directory from the slave network management device.

169. A computer-readable medium according to claim 168, wherein only the master network management device supports a user interface for management of the master network management device, the slave network management device and all network devices having entries in the respective device management directories of each network management device.

170. A computer-readable medium according to claim 168, wherein each network management device on the network supports a user interface for obtaining information and managing the particular network management device and all network devices having entries in the respective device management directories of all network management devices.

171. A computer-readable medium according to claim 168, wherein the master network management device creates a combined device management directory containing entries from the device management directory of the master network management device and from the device management directory of the slave network management device.

172. A computer-readable medium according to claim 171, wherein the master network management device sends a backup copy of the combined device management directory to the slave network management device.

173. A computer-readable medium according to claim 172, wherein, in the case of failure of the master network management device, the slave network management device is re-designated as the master network management device.

174. A computer-readable medium according to claim 164, wherein the network management device creates and maintains a plurality of print queues corresponding to a determined subset of the plurality of printing devices, and wherein the second network management device creates and maintains a plurality of print queues corresponding to the remaining ones of the plurality of printing devices.

175. A computer-readable medium according to claim 174, wherein the determined subset is determined based on a resource availability indicator for each of the network management devices.

176. A computer-readable medium according to claim 164, wherein the network management device instructs the second network management device via the main network to disable a capability of the second network management device to send and detect address assignment messages.

177. A computer-readable medium according to claim 159, wherein a plurality of network management devices are connected to the main network via a first interface card in each respective network management device, and wherein each respective network management device is connected to a separate plurality of network devices on a separate local network via a second interface card.

178. A computer-readable medium according to claim 177, wherein a designated one of the plurality of network management devices collects information from each of the other network management devices regarding a set of functional services that each network management device supports for each of the separate plurality of network devices connected to the respective network management device.

179. A computer-readable medium according to claim 178, wherein the designated network management device generates a global functional services directory based on the collected information.

180. A computer-readable medium according to claim 167, wherein the master network management device collects information from the slave network management device regarding a set of functional services that the slave network management device supports for each of the plurality of network devices.

181. A computer-readable medium according to claim 180, wherein the master network management device generates a local functional services directory based on the collected information from the slave network management device and based on information regarding a set of functional services that the master network management device supports for each of the plurality of network devices.

182. A network management device for managing a plurality of network printers on a network, said computing device comprising:

a program memory for storing process steps executable to perform the steps of (a) receiving an address request message from one of the plurality of network printers, the address request message containing a MAC address corresponding to the network printer, (b) sending an address assignment message from an address server in the network management device over the network to the network printer, the address assignment message containing the MAC address and an assigned IP address corresponding to the network printer, (c) notifying a discovery module in the network management device of the assigned IP address of the network printer, (d) determining, in the discovery module, if the MAC address of the network printer is within a predetermined range of MAC addresses, (e) sending, in the case that the MAC address of the network printer is within the predetermined range of MAC addresses, an information request message from the discovery module over the network to the network printer, the information request message containing the assigned IP address corresponding to the network printer, (f) receiving, in the case that the MAC address of the network printer is within the predetermined range of MAC addresses, information from the network printer in response to the information request message, and (g) creating, in the case that the MAC address of the network printer is within the predetermined range of MAC addresses, an entry corresponding to the network printer in a device management directory, the entry containing the MAC address and the assigned IP address corresponding to the network printer, and containing the information received from the network printer; and a processor for executing the process steps stored in said program memory.

183. Computer-executable process steps stored on a computer readable medium, said computer-executable process steps for managing a plurality of network printers on a network by a network management device, said computer-executable process steps comprising the steps of:

- a first receiving step of receiving an address request message from one of the plurality of network printers, the address request message containing a MAC address corresponding to the network printer;
- a first sending step of sending an address assignment message from an address server in the network management device over the network to the network printer, the address assignment message containing the MAC address and an assigned IP address corresponding to the network printer;
- a notifying step of notifying a discovery module in the network management device of the assigned IP address of the network printer;
- a determining step of determining, in the discovery module, if the MAC address of the network printer is within a predetermined range of MAC addresses;
- a second sending step of sending, in the case that the MAC address of the network printer is within the predetermined range of MAC addresses, an information request message from the discovery module over the network to the network printer, the information request message containing the assigned IP address corresponding to the network printer;
- a second receiving step of receiving, in the case that the MAC address of the network printer is within the predetermined range of MAC addresses, information from the network printer in response to the information request message; and
- a creating step of creating, in the case that the MAC address of the network printer is within the predetermined range of MAC addresses, an entry corresponding to the network printer in a device management directory, the entry containing the MAC address and the assigned IP address corresponding to the network printer, and containing the information received from the network printer.

184. A computer-readable medium which stores computer-executable process steps, the computer-executable process steps to manage a plurality of network printers on a network by a network management device, said computer-executable process steps comprising:

- a first receiving step of receiving an address request message from one of the plurality of network printers, the address request message containing a MAC address corresponding to the network printer;
- a first sending step of sending an address assignment message from an address server in the network management device over the network to the network printer, the address assignment message containing the MAC address and an assigned IP address corresponding to the network printer;
- a notifying step of notifying a discovery module in the network management device of the assigned IP address of the network printer;
- a determining step of determining, in the discovery module, if the MAC address of the network printer is within a predetermined range of MAC addresses;
- a second sending step of sending, in the case that the MAC address of the network printer is within the predetermined range of MAC addresses, an information request message from the discovery module over the network to the network printer, the information request message containing the assigned IP address corresponding to the network printer;
- a second receiving step of receiving, in the case that the MAC address of the network printer is within the predetermined range of MAC addresses, information from the network printer in response to the information request message; and
- a creating step of creating, in the case that the MAC address of the network printer is within the predetermined range of MAC addresses, an entry corresponding to the network printer in a device management directory, the entry containing the MAC address and the assigned IP address corresponding to the network printer, and containing the information received from the network printer.

* * * * *